(12) United States Patent
Kozuki et al.

(10) Patent No.: US 7,951,886 B2
(45) Date of Patent: May 31, 2011

(54) CONTINUOUS PRODUCTION METHOD OF WATER-SOLUBLE POLYMER AND WATER-SOLUBLE POLYMER

(75) Inventors: Hidekazu Kozuki, Tatsuno (JP); Noboru Sakamoto, Takatsuki (JP); Takahiro Tsumori, Nishinomiya (JP); Atsuro Yoneda, Toyonaka (JP); Kaori Nakatani, Takasago (JP); Hideo Wakami, Omihachiman (JP)

(73) Assignee: Nippon Shokubai Co., Ltd., Osaka-Shi, Osaka (JP)

( * ) Notice: Subject to any disclaimer, the term of this patent is extended or adjusted under 35 U.S.C. 154(b) by 1156 days.

(21) Appl. No.: 11/512,284

(22) Filed: Aug. 30, 2006

(65) Prior Publication Data

US 2007/0049710 A1    Mar. 1, 2007

(30) Foreign Application Priority Data

Aug. 31, 2005 (JP) ................. 2005-251515
Jan. 20, 2006 (JP) ................. 2006-012985

(51) Int. Cl.
*C08F 20/06* (2006.01)
*C08F 2/00* (2006.01)

(52) U.S. Cl. ............... 526/317.1; 526/68

(58) Field of Classification Search ............ 526/68, 526/89, 139, 140, 213, 229, 233
See application file for complete search history.

(56) References Cited

U.S. PATENT DOCUMENTS

| | | | |
|---|---|---|---|
| 5,077,361 A | 12/1991 | Hughes et al. | |
| 5,294,686 A | 3/1994 | Fiarman et al. | |
| 5,308,532 A | 5/1994 | Adler et al. | |
| 5,420,215 A | 5/1995 | Amano et al. | |
| 5,604,291 A | 2/1997 | Kerr et al. | |
| 5,616,283 A | 4/1997 | Huege et al. | |
| 5,620,744 A | 4/1997 | Huege et al. | |
| 6,320,000 B1 | 11/2001 | Hurry et al. | |
| 6,660,814 B1 | 12/2003 | Kroner et al. | |
| 6,943,222 B2 | 9/2005 | Yoneda et al. | |
| 2002/0121483 A1 | 9/2002 | Krulik | |
| 2004/0048969 A1 | 3/2004 | Kirsch et al. | |
| 2004/0152854 A1 | 8/2004 | Yoneda et al. | |

FOREIGN PATENT DOCUMENTS

| | | | |
|---|---|---|---|
| EP | 0097495 | * | 1/1984 |
| EP | 97495 A1 | * | 1/1984 |
| EP | 0510831 A1 | | 10/1992 |
| EP | 0519603 A1 | | 12/1992 |

(Continued)

OTHER PUBLICATIONS

Translation of Yoneda.* Translation of Naotake.*
Extended European Search Report issued in European Application No. 06119753.9 on Apr. 2, 2008.

(Continued)

*Primary Examiner* — David Wu
*Assistant Examiner* — Elizabeth Eng
(74) *Attorney, Agent, or Firm* — Connolly Bove Lodge & Hutz LLP

(57) ABSTRACT

To provide a continuous production method for producing a water-soluble polymer with a narrow molecular weight distribution with high efficiency. A continuous production method of a water-soluble polymer, comprising the steps of: circulating a circulation liquid containing a monomer having a polymerizable unsaturated bond through a reaction apparatus: having a tank and a circulation line comprising a piping circulating outside the tank, and thereby producing a water-soluble polymer continuously; and discharging part of the circulation liquid from a discharge line, wherein the circulation line is provided with a cooling device at least at one position.

12 Claims, 3 Drawing Sheets

FOREIGN PATENT DOCUMENTS

| | | | |
|---|---|---|---|
| EP | 0676422 | A1 | 10/1995 |
| EP | 0792890 | A1 | 9/1997 |
| EP | 0942015 | | 9/1999 |
| EP | 0969024 | A2 | 1/2000 |
| JP | 11-315115 | | 11/1999 |
| JP | 2001-098002 | * | 4/2001 |
| JP | 2001-98002 | A | 4/2001 |
| JP | 2001098002 | A * | 4/2001 |
| JP | 2001098002 | A * | 10/2001 |
| JP | 2003-2909 | A | 1/2003 |
| JP | 2003-40912 | A | 2/2003 |
| JP | 2004-244617 | A | 9/2004 |
| JP | 2004244617 | A * | 9/2004 |

OTHER PUBLICATIONS

Hague et al., Functionalized Poly(acrylic acid) as a Precursor of Water-Soluble Macroiniferter: Analysis of Molecular Weight, Makromol. Chem., Rapid Commun. 14, 59-62 (1993).

Loiseau et al., Synthesis and Characterization of Poly(acrylic acid) Produced by Raft Polymerization. Application as a Very Efficient Dispersant of $CaCO_3$, Kaolin, and $TiO2$, Macromolecules 2003, 36, 3066-3077.

Nauman, Chemical Reactor Design, Optimization, and Scaleup, McGraw-Hill 2002, pp. 177-179.

* cited by examiner

CONTINUOUS PRODUCTION METHOD OF WATER-SOLUBLE POLYMER AND WATER-SOLUBLE POLYMER

This application claims priority from Japanese Applications 2005-251515 filed Aug. 31, 2005 and 2006-012985, filed Jan. 20, 2006.

TECHNICAL FIELD

The present invention relates to a continuous production method of water-soluble polymers. More preferably, the present invention relates to a method for continuously producing water-soluble polymers useful as dispersants of pigments and the like, detergent builders to water and the like, scale inhibitors or inorganic pigment dispersants.

BACKGROUND OF THE INVENTION

Water-soluble polymers have excellent functional performances as thickeners, cohesive agents, flocculants, desiccants, drying agents, surface modifiers, cohesive improvers, dispersants, and the like, and have been frequently used industrially. Such water-soluble polymers have been variously used in, for example, medical drugs, coating materials, paper manufacture, cleaning agents and cosmetics, water treatment, fiber treatment, civil engineering and construction, art of agriculture, gardening, adhesives, ceramic industry, manufacturing process, and other fields as well as excavated soil treatment agents, additives for anti-inflammatory analgesic plasters or cataplasms, and dredged soil treatment agents. Water-soluble polymers with high quality in viscosity or residual amount of monomers have been used for foods or animal feeds as a thickener or an accelerator for ravelling, for example.

As conventional production methods of water-soluble polymers, disclosed is a process for producing sodium acrylate with a high concentration by a batch polymerization under control of foaming arising or temperature, wherein a batch type reaction apparatus with a cooling device, a tank reactor, a stirring mixer is disclosed (for example, referring to Japanese Kokai Publication No. 2004-244617 (pages 2, 8 to 10, and 41). However, this production method needs a large apparatus for securing high productivity, and has room for improvement in order to produce a polymer having a desired molecular weight distribution because the obtained polymer has a relatively wide molecular weight distribution (Mw/Mn). The molecular weight distribution (Mw/Mn) is calculated by dividing a weight average molecular weight (Mw) by a number average molecular weight (Mn).

Disclosed is a method for continuously producing polyacrylic acid with a narrow molecular weight distribution in which a plurality of reaction apparatuses are serially disposed (for example, referring to Japanese Kokai Publication No. 2003-002909, pages 2, 4 to 7, and Japanese Kokai Publication No. 2003-040912, pages 2, 5 to 8). And in Examples, disclosed is a continuous stirred tank serial reaction apparatus composed of first to third tank reactors, a cooling device in the second reactor if needed, and a stirring mixer. This reaction apparatus is a continuous apparatus, but the stirred tanks are serially coupled as the first to third reactors. A reaction liquid is made to flow from the first reactor to the third reactor in this order and discharged from the third reactor. Such serial reaction apparatuses have room for improvement in reduction of reaction time, productivity, or heat removal efficiency in order to industrially efficiently produce polyacrylic acid.

In addition, disclosed is a method for continuously producing polyacrylic acid with a narrow molecular weight distribution using a loop-type circulation line (for example, referring to Japanese Kokai Publication No. 2001-098002, pages 2 to 9), wherein a circulating type continuous reaction apparatus having a piping reactor and a motionless mixer is disclosed. However, this production method has room for improvement in order to further improve the productivity by sufficiently improving the heat removal efficiency and reducing the reaction time.

SUMMARY OF THE INVENTION

The present invention has been made in view of the above-mentioned state of the art. The present invention has an object to provide a continuous production method of a water-soluble polymer with a narrow molecular weight distribution with high efficiency.

The present inventors have made various investigations about production methods of water-soluble polymers. They have noted that a continuous reaction apparatus having a tank and a loop type piping (circulation line) circulating outside the tank is excellent in productivity. They have found that a continuous stirred tank serial reaction apparatus with a cooling device in the circulation line makes it possible to uniform a temperature distribution inside the reaction apparatus and to easily control the temperature, and therefore the reaction can be performed at a high polymerization concentration and a concentration of residual monomers can be reduced. They have also found that the productivity can be higher because such a production apparatus needs no maturing step and permits polymerization reaction in a short reaction time (retention time). For production of polymers with a narrow molecular weight distribution (Mw/Mn), there is usually concern that the polymerization concentration is lowered, the reaction time is prolonged, or the productivity per time reduces. However, they have found that, because of the above-mentioned properties, the apparatus makes it possible to uniform the monomer concentration and produce water-soluble (co)polymers with a narrow Mw/Mn with high productivity. Thereby, the above-mentioned problems can be solved. Further, they have also found that the obtained polymer has a sufficiently narrow Mw/Mn, and therefore can be preferably applied in various applications such as detergent builders, scale inhibitors, and inorganic pigment dispersants. Thereby, the present invention has been completed.

That is, the present invention is a continuous production method of a water-soluble polymer, comprising the steps of: circulating a circulation liquid containing a monomer having a polymerizable unsaturated bond through a reaction apparatus having a tank and a circulation line comprising a piping circulating outside the tank, and thereby producing a water-soluble polymer continuously; and discharging part of the circulation liquid from a discharge line, wherein the circulation line is provided with a cooling device at least at one position.

BRIEF DESCRIPTION OF THE DRAWINGS

FIG. 1 is a conceptual diagram showing one embodiment of the continuous production method of the water-soluble polymer of the present invention.

FIG. 2 is a conceptual diagram showing one embodiment of the continuous production method of the water-soluble polymer of the present invention.

FIG. 3 is a figure showing a relationship between the weight average molecular weight and the Mw/Mn in the polymer of the present invention and the comparative polymer.
FIG. 4 is a figure showing a relationship between the number average molecular weight and the Mw/Mn in the polymer of the present invention and the comparative polymer.
FIG. 5 is a figure showing a relationship between the weight average molecular weight and the absorbance in the polymer of the present invention and the comparative polymer.
FIG. 6 is a conceptual diagram showing an area ratio measured by gel permeation chromatography (GPC).

EXPLANATION OF NUMERALS AND SYMBOLS

Figure 1:
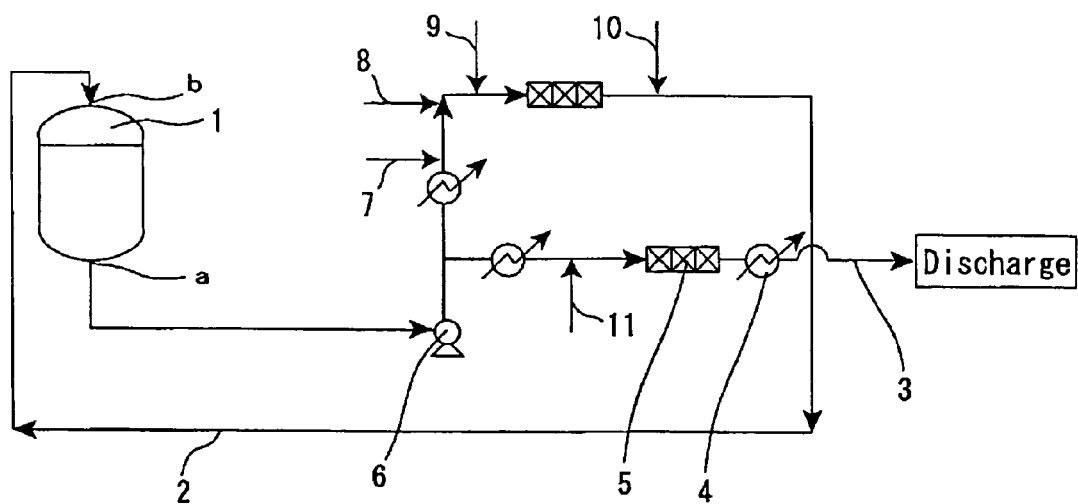
[FIG. 1]

1: tank
2: circulation line
3: discharge line
4: cooling device
5: motionless mixer
6: circulation pump
7: alkali chemical supply port
8: raw material supply port
9: chain transfer agent supply port
10: polymerization initiator supply port
11: agent supply port
a: circulation line outlet from tank 1
b: circulation line into tank 1

DETAILED DESCRIPTION OF THE INVENTION

The present invention is described in more detail below.

The continuous production method of the water-soluble polymer of the present invention comprises steps of: circulating a circulation liquid containing a monomer having a polymerizable unsaturated bond through a reaction apparatus having a tank and a circulation line comprising a piping circulating outside the tank, and thereby producing a water-soluble polymer continuously; and discharging part of the circulation liquid from a discharge line. That is, the production method is a method for producing a water-soluble polymer using: a reaction apparatus essentially having a tank and a circulation line; and a discharge line (hereinafter, the reaction apparatus and the discharge line are together referred to as "production apparatus").

The above-mentioned circulation line comprising a piping circulating outside the tank is provided with a cooling device at least at one position. If the circulation line has a cooling device, reaction heat attributed to polymerization heat, dilution heat, neutralization heat, decomposition heat, dissolution heat, or the like, can be removed. Thereby, a temperature distribution inside the reaction apparatus can be uniformed and the temperature can be easily controlled. Therefore, water-soluble polymers with a narrow Mw/Mn can be produced. If the reaction apparatus comprises no cooling devices and therefore the above-mentioned reaction heat is insufficiently removed, the reaction is rapidly accelerated, and thereby the following problems can be generated for example, possibly failing in handling: the temperature reaches to a boiling point; a great amount of Michael adducts is generated; or a chain transfer agent does not act as a chain transfer agent if used. The present invention can be preferably applied in reactions of (meth)acrylic acid, salts thereof, esters, acrylic amide, N-substitution thereof, or the like, in which the polymerization proceeds quickly. In this case, the polymerization reaction can be sufficiently mild polymerization reaction because of the cooling. Particularly in the polymerization reaction of acrylic acid and/or a salt thereof, the apparatus essentially has a cooling device for removing reaction heat because the reaction proceeds so quickly that 90% or more of raw materials converts into water-soluble polymers in 30 seconds, and the reaction heat with the reaction is large, depending on reaction conditions such as an initiator to be used, as mentioned below.

The above-mentioned cooling device can be provided for the circulation line, and can lower the temperature of the circulation liquid passing inside the cooling device, thereby removing at least several percents of the reaction heat. For example, preferred is a cooling device capable of removing 30% or more of generated reaction heat. If the reaction heat is insufficiently removed, the obtained water-soluble polymer may have an insufficient narrow Mw/Mn. The cooling device can more preferably remove 50% or more of generated reaction heat, and still more preferably remove 70% or more of generated reaction heat. The removal of the reaction heat makes it possible for the reaction temperature (polymerization temperature) of the circulation liquid to be within a preferable range mentioned below, for example.

The above-mentioned cooling device preferably satisfies a relationship between a volume of the circulation liquid V [m$^3$] and a heat transmission area of the cooling device S [m$^2$] of S/V>=5. If satisfying such a relationship, the cooling device can sufficiently cool the circulation liquid, and thereby the functional effects of the present invention can be exhibited. The relationship of S/V is more preferably 6.5 or more, and still more preferably 8 or more.

The above-mentioned cooling device may satisfy the above-mentioned requirement in at least one of the removal efficiency of the reaction heat and the S/V. However, it is preferable that the cooling device satisfies both of the above-mentioned requirements.

In the structure of the above-mentioned cooling device, the shape, the type, the placed number, the placed position, and the like are not especially limited as long as the functional effects are exhibited. Examples of the shape or the type of the cooling device include multi-tube cylinder type devices, double tube type devices, plate type devices, air conditioners, irrigation air conditioners, coil type devices, swirl type devices, and jackets. Any of generally widely used cooling devices and heat exchangers may be adopted. They may be used singly or in combination. If a jacket or the like is used, the length of the part contacting the piping or the tank is not especially limited. One or a plurality of the cooling devices may be provided. If a plurality of the cooling devices is placed, the devices may be placed at one position or may be placed separately. It is preferable that the cooling devices are separately placed such that cooling efficiency becomes higher. If an amount of generated reaction heat is large, it is preferable that a plurality of the cooling devices is separately placed. As the placed position, the cooling device is provided for the circulation line, and may be provided for the tank. If the cooling device is provided for the tank, a gradient is generated in temperature and concentration, and thereby the molecular weight distribution may become wider. Therefore, the cooling device needs to be placed with sufficient attention to such a gradient.

If the piping is just made longer without a jacket or a double tube, heat dissipation becomes large and the temperature of the circulation liquid lowers. However, such a way causes increase in construction costs of the piping and the apparatus or needs strengthening of pumping power. Also, the above-mentioned requirement in the capability as the cooling device may not be satisfied, and a state where circulation liquid keeps a large temperature gradient. Therefore, such a way is not preferable for physical properties of polymers. And such a way is not preferable in view of productivity because the retention time becomes longer, although the reaction heat amount per unit time can be decreased.

The above-mentioned tank can temporarily retain the circulation liquid and preferably has a sufficient capacity as compared with that of the piping. In the present invention, the reaction liquid returns to the tank and then circulates. Therefore, the tank is also referred to as recycle tank meaning a circulation liquid tank. It is preferable that the tank (also referred to as recycle tank) has a capacity of 10% by volume or more to that of the whole of the circulation line. If the tank has a capacity of less than 10% by volume, problems are generated, for example, the piping becomes too long. Also from viewpoints of pressure loss accompanying such problems, such a tank insufficiently functions as a reactor in which the polymerization reaction proceeds, and therefore the productivity in the water-soluble polymer may be insufficiently improved. The tank more preferably has a capacity of 30% by volume or more.

It is preferable that the above-mentioned tank functions as a reactor in which the polymerization reaction proceeds as well as retains and circulates the circulation liquid.

The productivity in the water-soluble polymer can be higher because the above-mentioned tank constitutes part of the reaction apparatus. Therefore, polymers having a desired low molecular weight can be produced even if a concentration of a polymerization liquid or a feed amount of monomers is increased. In a continuous polymerization method using a loop type reactor (circulation line) without the tank (also referred to as recycle tank), polymers with a desired low molecular weight can not be obtained if a concentration of a polymerization liquid or a feed amount of monomers is increased for enhancing the productivity. In contrast, the recycle tank is provided for the loop type reactor (the reaction apparatus) in the present invention. Therefore, polymers with a desired low molecular weight can be produced with high productivity even if a concentration of a polymerization liquid or a feed amount of monomers is increased.

Therefore, it is preferable that the tank has a stirrer and a nozzle through which an additive such as a polymerization initiator, a polymerization accelerator, and a chain transfer agent is supplied. That is, it is preferable that the circulation liquid inside the recycle tank is stirred, or a polymerization initiator, a polymerization accelerator, or a chain transfer agent is/are added to accelerate the polymerization. It is mainly preferable that the polymerization reaction is accelerated. The recycle tank may be provided with a vapor-liquid separator if needed, and thereby the circulation liquid may be circulated inside the circulation line while extracting gas.

Figure 2:
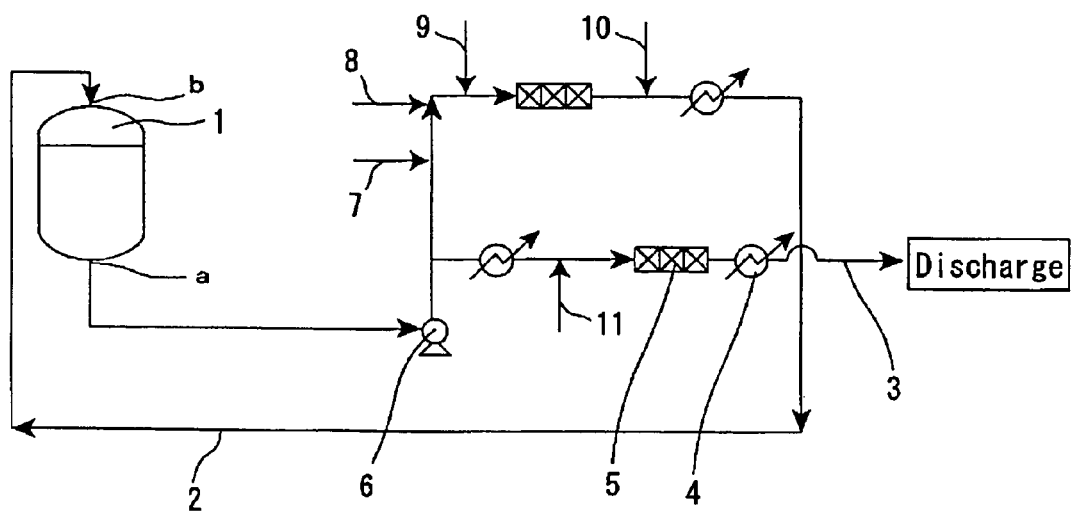
[FIG. 2]

The above-mentioned piping circulating outside the tank is connected to an outlet of the tank (outlet of the circulation liquid) and an inlet of the tank (inlet of the circulation liquid) and forms the circulation line (loop structure) together with the tank. If explained in FIGS. 1 and 2 showing one example of preferable embodiments of the present invention, the "circulation line" is a section shown by "a" to "b", "a" being a tank bottom (outlet of the tank) and "b" being an upper tank (inlet of the tank) to which the circulation liquid returns in FIGS. 1 and 2. In the above-mentioned piping, the circulation liquid is retained and circulated, and generally, the polymerization reaction proceeds.

The production apparatus of the present invention is preferably made of SUS in terms of heat transmission and corrosion resistance. Specifically, SUS304, SUS316, SUS316L may be mentioned. In these cases, conventionally publicly known scale inhibitors may be applied to the production apparatus, or this (conventionally publicly known scale inhibitors) may be added in an aqueous suspension mixture (circulation liquid). The same applies to below-mentioned various supply ports that may be provided for the production apparatus of the present invention.

In the production method, a placed position of a raw material supply port is not especially limited as long as the functional effects of the present invention are exhibited. The raw material supply port may be provided at any positions of the production apparatus (the tank, the circulation line and the discharge line), and preferably provided for the circulation line. A raw material is supplied into the circulation line, and thereby stirring is not necessarily needed, leading to advantages in terms of apparatus and costs. The placed number of the above-mentioned raw material supply port is not especially limited and may be at least one or more. As mentioned above, an embodiment in which the circulation line is provided with a raw material supply port at least at one position is one of the preferable embodiments of the present invention.

The above-mentioned production method comprises a step of discharging part of the circulation liquid from the discharge line. It is preferable that the discharge line is provided with the cooling device at least at one position. If the discharge line is provided with the cooling device, the obtained product can be sufficiently cooled, and the apparatus can be simplified if a post step such as removal of the monomers in the polymers or neutralization is performed. And the reaction heat can be sufficiently removed even in an embodiment mentioned below in which the discharge line is provided with the raw material supply port. Therefore, a mixed liquid of the circulation liquid and the raw material that is discharged from the discharge line have a suitable temperature. The above-mentioned cooling devices are preferable as such a cooling device which can be provided for the discharge line.

It is preferable that the above-mentioned production apparatus (the tank, the circulation line and the discharge line) is provided with at least one device for mixing the circulation liquid in order to uniform a concentration distribution of the raw material of the circulation liquid. Examples of the mixing device include: motor driving type devices represented by stirring blade, such as paddle blades, Max Blend (registered trademark), anchor blade; plane driving type devices represented by shaker; jet collision type devices; ultrasonic distribution type devices; and motionless mixers. The type of the mixing device is not limited as long as the liquid can be sufficiently mixed. Among them, preferred are stirring devices using paddle blades, Max Blend and anchor blade, and motionless mixers. Stirring devices and motionless mixers are more preferable and motionless mixers are still more preferable.

The placed position of the above-mentioned mixing device is not especially limited as long as the circulation liquid can be mixed. The mixing device is preferably provided for the reaction apparatus in the production apparatus. Examples of configurations of the placed position include (1) a configuration in which a general stirrer is provided inside the tank; (2) a configuration in which a motionless mixer is provided for the circulation line, (3) a configuration in which a stirring device is provided for the circulation line, (a configuration in which a stirring type reaction apparatus is provided for the circulation line); and (4) a configuration in which the mixing is performed by external force such as supersonic wave from the outside of the circulation line and the tank. One or two or more configurations is/are preferable. Among them, a configuration in which the configurations (1) and (2) are combined is preferable, and thereby the circulation liquid can be homogeneous inside both of the tank and the circulation line. In the above-mentioned configuration (2), a motionless mixer excellent in stirring capability is provided for the circulation line. Thereby, the circulation liquid, the raw material, an initiator mentioned below, or the like, can be efficiently mixed, and therefore the concentration gradient reduces, which makes it possible to make the circulation liquid more homogeneous. As mentioned above, an embodiment in which the circulation line is provided with a motionless mixer is one of the preferable embodiments of the present invention. In the present invention, a motionless mixer is preferably used as the stirring device particularly if the stirring device is provided for the circulation line. However, another stirring device may be used as long as the functional effects of the present invention can be exhibited. Hereinafter, another stirring device other than the motionless mixer may be used in stead of or in combination with the motionless mixer.

The above-mentioned raw material supply port is positioned between the cooling device and the tank, or between the tank and the cooling device, in the flow passage direction of the circulation liquid inside the circulation line. Either configuration is preferable. If the raw material supply port is positioned between the cooling device and the tank, the raw material is supplied on the downstream side of the cooling device, and thereby restoration can be easily performed even if unexpected situation, such as blockage inside the piping, happens. If the raw material supply port is positioned between the tank and the cooling device, a side reaction, which is not preferable, can be suppressed in the reaction system with remarkably large reaction heat. If the circulation line is provided with a motionless mixer, the raw material supply port may be positioned at any places of the circulation line. If the circulation line is provided with a motionless mixer, for example, the raw material supply port may be positioned at any places of the following: inside the motionless mixer; between the tank and the motionless mixer; or between the motionless mixer and the tank, in the flow passage direction of the circulation liquid inside the circulation line. Among them, it is preferable that the raw material supply port is positioned inside the motionless mixer, or between the tank and the motionless mixer in the flow passage direction of the circulation liquid inside the circulation line. The raw material is added in the motionless mixer or just before the motionless mixer, thereby being immediately stirred by the motionless mixer. Therefore, the raw material has a uniform concentration distribution, and thereby a water-soluble polymer with a narrow Mw/Mn can be obtained. The raw material supply port is more preferably placed between the cooling device and the motionless mixer in the flow passage direction of the circulation liquid.

In the production method of the water-soluble polymer of the present invention, a polymerization initiator may be added. The position and the number of the polymerization initiator supply port are not especially limited as long as the functional effects of the present invention are exhibited. The polymerization initiator supply port may be placed at any positions of the production apparatus. That is, the above-mentioned circulation line may have an initiator supply port (polymerization initiator supply port) (1) between the cooling device and the tank, or (2) between the tank and the cooling device, in the flow passage of the circulation liquid. If at least one initiator supply port is provided at the position mentioned in (1), the circulation liquid returning to the tank has a certain temperature and therefore the temperature gradient can be extremely reduced. If at least one initiator supply port is provided at the position mentioned in (2), the concentration of the initiator is uniform in the remarkably quickly reaction system, and thereby a runaway reaction in the inlet port, which is not desired, can be suppressed. The preferable embodiments of the present invention include the continuous production method of the water-soluble polymer in the reaction apparatus having the tank and the circulation line comprising a piping circulating outside the tank, wherein the circulation line is provided with the cooling device, the raw material supply port, and the polymerization initiator supply port.

If the circulation line is provided with a motionless mixer, it is preferable that the polymerization initiator is supplied between the motionless mixer and the tank, or between the tank and the motionless mixer, in the flow passage direction of the circulation liquid inside the circulation line. In either case, the motionless mixer can sufficiently mix the circulation liquid.

The production method of the present invention comprises a step of discharging part of the circulation liquid from the discharge line. Therefore, the production apparatus comprises at least one discharge line. The placed position of the discharge line is not especially limited as long as the functional effects of the present invention are exhibited. The discharge line may be placed at any positions of the reaction apparatus (the tank, the circulation line), and preferably provided for the circulation line in view of easiness in maintenance and costs attributed to simplification of the line. It is more preferable that the discharge line is positioned between the tank and the cooling device or between the tank and the raw material supply port, in the flow passage direction of the circulation liquid, in view of simplification of the piping route and the facility. If the tank, the cooling device, and the raw material supply port are disposed in this order in the flow passage direction of the circulation liquid, the discharge line is still more preferably positioned between the tank and the cooling device. If the tank, the raw material supply port, and the cooling device are placed in this order, the discharge line is still more preferably positioned between the tank and the raw material supply port. If the discharge line is placed at such a position, a solution having the lowest monomer concentration in the circulation line, in which the polymerization most proceeds, can be discharged.

In the production method of the present invention, it is preferable that a conversion efficiency showing a monomer conversion amount at an inlet of the tank relative to the addition amount of the monomer at the raw material supply port is 90% or more. If the conversion efficiency is less than 90%, a lot of the monomers remain, possibly leading to reduction in productivity. The conversion efficiency is more preferably 96% or more, and still more preferably 99% or more. The above-mentioned conversion efficiency can be calculated based on Arrhenius' equation from results of simulation in reaction rate analysis, obtained by varying an initiator amount, a transfer agent amount, an accelerator amount, a temperature, and a retention time in a case where sodium polyacrylate (PSA) is produced using sodium acrylate as the monomer, for example. The above-mentioned conversion efficiency in a copolymer of (meth)acrylic acid (salt)/(meth) acrylic acid ester, and the like, is possibly different from the conversion efficiency in a homopolymer of PSA, and the like, in a continuous stirred tank reactor: CSTR). However, the preferable range of the conversion efficiency is as mentioned above. The above-mentioned monomer is described in more detail below. As mentioned above, the continuous production method of the water-soluble polymer, wherein a monomer conversion efficiency at an inlet of the tank is 90% or more, is one of the preferable embodiments of the present invention.

In the production method of the present invention, the polymerization reaction inside the circulation line can be performed under pressurization conditions. If the polymerization reaction inside the circulation line is performed under pressurization, the reaction can be performed at high temperatures, and the reaction can be accelerated. Thereby, the monomers hardly remain and improvement in productivity can be expected. The polymerization reaction inside the circulation line can be performed under pressurization for example, by controlling the flow amount or the temperature of the circulation liquid. The pressure inside the above-mentioned circulation line is not especially limited and preferably 0.1 Mpa to 3.0 Mpa, and more preferably 0.12 Mpa to 1.0 Mpa. The above-mentioned polymerization reaction under pressurization is not limited to the reaction inside the circulation line, and the polymerization reaction inside the tank and/or the circulation line may be performed under pressurization.

The liquid temperature (polymerization temperature) of the circulation liquid inside the above-mentioned circulation line is not especially limited as long as the functional effects of the present invention can be exhibited. The polymerization temperature is generally 25 to 150° C. The polymerization temperature is preferably 50° C. or more, and more preferably 70° C. or more. Also, the polymerization temperature is preferably 130° C. or less, and more preferably 99° C. or less, and the polymerization may be performed at less than 95° C. If the polymerization temperature is within the range of 25 to 150° C. and the polymerization time is appropriate, sufficient productivity can be attained without increase of the molecular weight and impurities, and the like. The polymerization temperature is generally preferably 60 to 130° C. if the polymerization initiator is used, depending on the half-value period. More preferably, the polymerization temperature is 80 to 120° C. It is preferable that the polymerization temperature is controlled to temperatures less than the boiling point of the reaction liquid, because a cheap and widely used polymerization initiator can be used. The temperature in the tank is within the above-mentioned range. It is preferable that a difference in temperature between the inlet of the tank (the outlet of the circulation line) and the outlet of the tank (the inlet of the circulation line) is within 25° C., as mentioned below.

The above-mentioned polymerization temperature may vary (increase or decrease) over time during the polymerization. The above-mentioned polymerization temperature may be temporarily out of the above-mentioned preferable range of the polymerization temperature, for example, at the beginning of the polymerization. With respect to the above-mentioned temperature variation of the polymerization temperature, a difference in temperature between the inlet of the circulation line and the outlet of the circulation line is preferably within 25° C. If the above-mentioned temperature variation is within 25° C., polymers with a narrow Mw/Mn can be produced, and a decomposition rate of the polymerization initiator can be constant rate and the polymerization can proceed uniformly. The temperature variation is more preferably within 20° C., and still more preferably within 18° C. The above-mentioned polymerization reaction can be performed under any conditions, for example, under air or inert gas atmosphere such as nitrogen and argon.

It is preferable that the polymerization is performed under feedback control as follows. A temperature sensor detects a temperature of the reactant and according to this detected value, a temperature of the heat exchanger is adjusted. Thereby, a temperature inside the reaction container (the production apparatus or the reaction apparatus) is almost the same as a target polymerization temperature (for example, defined as T° C.). The control range is preferably T° C.±10° C., and more preferably T° C.±7° C., and still more preferably T° C.±5° C.

The temperature control through the above-mentioned feedback control can be preferably used in a production apparatus for the polymer solution of 1 m$^3$ or more, because heat release from the reactor surface decreases and particularly, effect of cooling in the circulation line is easily shown. The temperature control is more preferably used in a production apparatus of 3 m$^3$ or more, and still more preferably used in a production apparatus of 5 m$^3$ or more. If the circulation liquid needs to be kept warm, heat retention may be performed for example, by controlling a temperature of a heating medium (or a cooling medium) flowing inside the jacket of the motionless mixer; controlling the supply amount of the monomer; keeping the piping and the tank warm (covered with a heat insulating material); and, if needed, supplying the tank and the piping with heat.

In the above-mentioned circulation liquid, it is preferable that a monomer concentration at an outlet of the tank is 0.3 mol/kg or less. If the monomer concentration is within such a range, a product finally obtained has an extremely low residual amount of the monomer. The monomer concentration is more preferably 0.15 mol/kg or less, and still more preferably 0.10 mol/kg or less. It is preferable that the lower limit of the monomer concentration is substantially 0 mol/kg or less.

In the production method of the present invention, the production apparatus may have a supply port for supplying other components, if needed. The supply port of other components is not especially limited as long as effects exhibited by addition of other components are obtained. The above-mentioned production apparatus is provided with one or more of the supply ports of other components. For example, in order to improve reaction efficiency of a desired polymer, the above-mentioned production apparatus may have, in the circulation line, an input port through which a reaction accelerator, an alkali chemical, or the like, can be input. As the above-mentioned other components, an alkali chemical, a polymerization accelerator, a chain transfer agent may be added. A cross linking agent also may be added unless the polymer loses the water solubility.

The above-mentioned alkali chemical is supplied and thereby the pH of the circulation liquid can be appropriately varied and the monomers can be partially or completely neutralized. Use of the polymerization accelerator or the chain transfer agent makes it possible to control the polymerization reaction and make the Mw/Mn of the obtained water-soluble polymers narrow.

If the alkali chemical, the polymerization accelerator, or the chain transfer agent is used as the above-mentioned other components, it is preferable that the supply port of other components is provided for the above-mentioned circulation line. That is, the above-mentioned circulation line preferable has the following configuration: (1) a configuration in an alkali chemical supply port is provided; (2) a configuration in which a polymerization accelerator supply port is provided; or (3) a configuration in which a chain transfer agent supply port is provided. These supply ports are preferably positioned between the discharge line and the tank, in the flow passage direction of the circulation liquid. If the tank, the discharge line, the cooling device are disposed in this order, in the flow passage direction of the circulation liquid inside the circulation line, the supply ports of other components are preferably positioned between the cooling device and the tank, or between the discharge line and the cooling device.

If the above-mentioned circulation line has a motionless mixer, the above-mentioned supply ports of other components are preferably positioned between the cooling device and the motionless mixer, in the flow passage direction of the circulation liquid. If the supply ports of other components are placed at such a position, the supplied components can be rapidly mixed with the monomer and the like homogeneously by the motionless mixer. FIG. 1 shows a case where the alkali chemical and the chain transfer agent are supplied between the cooling device and the tank in the flow passage direction of the circulation liquid inside the circulation line, and the alkali chemical supply port, the raw material supply port and the chain transfer agent supply port are placed in the order. FIG. 2 shows a case where the alkali chemical and the chain transfer agent are supplied between the tank and the cooling device in the flow passage direction of the circulation liquid inside the circulation line, and the alkali chemical supply port, the raw material supply port and the chain transfer agent supply port are placed in the order.

The production apparatus of the present invention comprises the discharge line. The discharge line preferably has a motionless mixer. If the discharge line is provided with at least one motionless mixer as mentioned above, a next step, such as addition of the initiator for removing the residual monomers and neutralization of the polymers, can be easily performed.

It is preferable that the above-mentioned discharge line is provided with the raw material supply port and has a mechanism in which the circulation liquid is mixed with the raw material and the mixed liquid then discharged. If the discharge line is provided with at least one of the raw material supply ports as mentioned above, the obtained water-soluble polymer contains an extremely low residual amount of the monomers. If the discharge line is provided with the cooling device or the motionless mixer, preferred is a configuration in which the raw material supply port is placed at least at one position on the upstream side of the cooling device or the motionless mixer. If the discharge line is provided with both of the cooling device and the motionless mixer, preferred is a configuration in which the cooling device is placed on the upstream side of the motionless mixer and the raw material supply port is placed between the cooling device and the motionless mixer. FIGS. 1 and 2 each show such a configuration.

The above-mentioned discharge line may further have the above-mentioned supply port for supplying other components. If the alkali chemical, the polymerization accelerator, or the chain transfer agent is used as the above-mentioned other components, the above-mentioned discharge line preferably has the following configuration: (1) a configuration in which the alkali chemical supply port is provided; (2) a configuration in which the polymerization accelerator supply port is provided; or (3) a configuration in which the chain transfer agent supply port is provided.

If the above-mentioned discharge line has the cooling device and/or the motionless mixer, the above-mentioned supply port of other components is preferably positioned between the cooling device and the motionless mixer, in the flow passage direction of the circulation liquid. If the discharge line has a plurality of the supply ports of other components, the placed position thereof can be appropriately determined.

Depending on a desired polymer, raw materials, such as the alkali chemical and the initiator, may be mixed in the discharge line, and in this case, the discharge line may be provided with a stirring type reactor and/or a motionless mixer.

The above-mentioned production apparatus may be provided with one or more circulation pump. The placed position, the placed number, and the type of the circulation pump are not especially limited as long as it can circulate the circulation liquid sufficiently. FIGS. 1 and 2 each show a case where the circulation pump is placed between the tank and the discharge line.

The production method of the present invention permits a reaction at a high polymerization concentration and needs no maturing steps. Therefore, the polymerization reaction can be performed for a short reaction (retention) time. The retention time means a total amount of the reaction liquid/an amount of the reaction liquid discharged per unit time. The above-mentioned retention time is preferably 240 minutes or less. If the retention time is within such a range, water-soluble polymers with a narrow Mw/Mn can be efficiently produced with high productivity. And water-soluble polymers with a sharp molecular weight distribution and excellent in various properties such as clay dispersibility can be produced. The retention time is more preferably 120 minutes or less, and still more preferably 80 minutes or less, and particularly preferably 60 minutes or less. The lower limit of the retention time is 3 minutes or more. As mentioned above, the preferable embodiments of the present invention include an embodiment in which the retention time of the circulation liquid in the tank and the circulation line is 240 minutes or less. As mentioned above, the retention time is short, and therefore high productivity can be provided. However, the reaction heat amount per unit time becomes larger. Accordingly, in the present invention, the reaction heat can be sufficiently removed and the temperature gradient can be reduced in the reaction system by providing the above-mentioned cooling device for the production apparatus. Thereby, characteristics of the production method can be most sufficiently exhibited.

In the production method of the present invention, as mentioned above, it is preferable that the temperature hardly varies and the difference in temperature between the inlet of the circulation line and the outlet of the circulation line is within 25° C. Further, it is preferable that the production method of the present invention satisfies the small variation in temperature and the short retention time. In the above-mentioned production method, it is preferable that the retention time of the circulation liquid in the tank and the circulation line is 120 minutes or less and the difference in temperature between the inlet of the circulation line and the outlet of the circulation line is within 25° C. The retention time and the difference in temperature are more preferably 120 minutes or less and within 20° C., respectively, and more preferably 60 minutes or less and within 20° C., and particularly preferably 30 minutes or less and within 15° C.

In the present invention, it is preferable that a circulation ratio is 3 or more, the circulation ratio (amount of liquid returning to the tank/amount of liquid discharged outside) being calculated by dividing an amount of liquid returning to the tank by an amount of liquid discharged from the discharge line to the outside of the production apparatus. If the circulation ratio is 3 or more, water-soluble polymers with a small concentration gradient and a narrow Mw/Mn can be produced with high productivity. As mentioned above, it is preferable that a cooling device with high cooling capacity is used for sufficient exhibition of the functional effects of the present invention in a short retention time. Therefore, the circulation ratio and the efficiency of the cooling device are important. The circulation ratio is more preferably 5 or more, and still more preferably 9 or more, and particularly preferably 10 or more.

A total amount of the components supplied into the above-mentioned circulation line (the monomer and the polymerization initiator, and if necessary, the supplied liquids such as the polymerization accelerator and the chain transfer agent) is preferably 0.1 to 50% by weight, and more preferably 0.5 to 20% by weight, relative to a total amount of the circulation liquid inside the circulation line. The productivity is remarkably reduced if the total amount of the supplied components is less than the above-mentioned range. If the total amount of the supplied components is more than the above-mentioned range, polymers with a narrow Mw/Mn can be hardly produced and a lot of the monomers may remain.

In the present invention, a water-soluble polymer with a narrow Mw/Mn can be produced. If such a water-soluble polymer is used as a detergent builder, a dispersant, a scale inhibitor, and the like, the water-soluble polymer preferably has a weight average molecular weight (Mw) of 1500 to 30000, and more preferably 2000 to 20000, and still more preferably 3500 to 15000, and still more preferably 4000 to 12000. If the above-mentioned water-soluble polymer is a homopolymer of (meth)acrylic acid(salt), the polymer preferably has a weight average molecular weight (Mw) of 1500 to 30000, and more preferably 2000 to 12000, and still more preferably 2000 to 10000. If the Mw/Mn becomes narrow within this molecular weight range, much more polymers with polymerization degree at a comparable level can be obtained. If used as a dispersant, the polymer has an influence preferably for the dispersant, such as improvement in dispersibility, on the dispersant. The Mw/Mn is preferably 7 or less, and more preferably 5 or less, and still more preferably 3.5 or less, and particularly preferably 3.2 or less, and most preferably 2.7 or less.

The above-mentioned Mw/Mn of the water-soluble polymer is preferably 7 or less, and more preferably 3.5 or less, if the weight average molecular weight (Mw) is 1500 to 30000, and preferably 2000 to 20000. The water-soluble polymer having a Mw/Mn within such a range can be preferably used in applications such as detergent builder, scale inhibitor, and in organic pigment dispersant. With respect to the Mw/Mn and the weight average molecular weight (Mw), the Mw/Mn is preferably 6.5 or less and more preferably 2.9 or less if the Mw is 1500 to 30000, and preferably 2000 to 15000. The Mw/Mn is preferably 5 or more and more preferably 2.7 or less if the Mw is 2000 to 12000.

As mentioned above, preferable is a water-soluble polymer showing a Mw/Mn of 7 or less if the weight average molecular weight (Mw) is 1500 to 30000 and preferably 2000 to 20000, and more preferable is a water-soluble polymer showing a Mw/Mn of 5 or less if the weight average molecular weight (Mw) is 1500 to 30000 and preferably 2000 to 12000.

The above-mentioned number average molecular weight (Mn), the weight average molecular weight (Mw) and the Mw/Mn of the polymer can be measured by GPC (gel permeation chromatography) measurement. The measurement conditions are as follows.

G-3000PWXL (trade name) produced by Tosho Corp. was used as a column for GPC.

An aqueous solution (0.1% by weight solid matter) prepared by the following procedures was used as a mobile phase: pure water was added to disodium hydrogenphosphate 12 hydrate 34.5 g and sodium dihydrogenphosphate dihydrate 46.2 g (both of them were special grade chemicals) to prepare a mixture 5000 g, and then the mixture was filtered through 0.45 μm membrane filter.

L-7110 (trade name) produced by Hitachi, Ltd. was used as a detecting element. A detection wavelength was 214 nm. The measurement was performed in UV measurement mode.

L-6000 produced by Hitachi, Ltd. was used as the pump. The flow rate of the mobile phase was 0.5 mL/minute and the temperature thereof was 35° C. The calibration curve was prepared using sodium polyacrylate standard sample produced by Sowa Science Corp. The molecular weight was calculated using SIC480II data station produced by System Instruments Co., Ltd.

Further, it is preferable that the temperature at the outlet of the production apparatus or the temperature at the input port into the polymerization reactor is 10 to 90° C. Thereby, the cooling can be performed stably. This temperature can be controlled by appropriately determining the flow rate of the solution and the temperature of the cooling medium in the production apparatus. In the production method of the present invention, the circulation amount of the polymerization solution may be constant amount, or may be varied continuously or gradually with the progress of the polymerization. The flow rate of the circulation liquid in the production apparatus can be appropriately determined depending on the production apparatus.

In the above-mentioned production method, it is preferable that an oxidizing agent is added between the discharge line and a next step. The above-mentioned next step is, for example, addition of the initiator for removing the residual monomers and neutralization of the polymers. Also it means a step of providing various treatments for the water-soluble polymer obtained by the above-mentioned production method such that the water-soluble polymer of the present invention can be preferably used in various applications such as detergent, water-treatment agent and dispersant. Preferred examples of the above-mentioned oxidizing agent include oxygen, ozone, hydrogen peroxide, persulfate, perchlorate, permanganate, dichromate, bromate, nitric acid (salt), and hypochlorite. The oxidizing agent is selectable depending on the kind of the initiator, the corrosiveness to the apparatus and the like, and the residual components in the obtained water-soluble polymer. Among them, oxygen, ozone, hydrogen peroxide, and persulfate are preferred.

In the present invention, the water-soluble polymer means a polymer containing a monomer having a polymerizable unsaturated bond and a hydrophilic functional group such as: acids such as carboxylic acid, phosphonic acid, and sulfonic acid, and salts thereof; amides; amines; and alcohols. Examples of the salts include alkali metal salts such as sodium and potassium; alkaline earth metal salts such as calcium and magnesium; ammonium salts; organic amine salts such as monoethanolamine and triethanolamine. These salts may be used singly or as a mixture of two or more species of them. Alkali metal salts such as sodium and potassium and ammonium salts are preferable, and sodium salt and ammonium salts are especially preferable as a preferable form of the salts.

As a raw material preferably used in the production method of the water-soluble polymer of the present invention, a material containing a monomer component capable of producing the water-soluble polymer by the above-mentioned production method can be preferably used. Such a monomer component is not especially limited and preferably is an unsaturated carboxylic acid monomer, for example. As mentioned above, the preferable embodiments of the present invention include the continuous production method of the water-soluble polymer, wherein a raw material comprises an unsaturated carboxylic acid monomer. The productivity can be further improved by previously charging desired polymers at the beginning of the polymerization.

The above-mentioned unsaturated carboxylic acid monomer (hereinafter, also referred to as monomer (I)) is a monomer having a polymerizable unsaturated group and a group which can form a carboanion, and preferably a compound represented by the following formula (1). [Formula 1]

In the formula, $R^1$, $R^2$, and $R^3$ are the same or different and each represents a hydrogen atom, a methyl group, or $-(CH_2)z1COOM^2$; z1 represents an integer of 0 to 3; $-(CH_2)z1COOM^2$ may form an anhydride together with $-COOM^1$ or another $-(CH_2)z1COOM^2$; $M^1$ and $M^2$ are the same or different, and each represents a hydrogen atom, a metal atom, an ammonium group or an organic amine group (organic ammonium group).

Preferred examples of the metal atom in $M^1$ and $M^2$ of the above formula (1) include monovalent metal atoms such as alkali metal atoms, such as lithium, sodium, and potassium; divalent metal atoms such as alkaline earth metal atoms, such as calcium and magnesium; trivalent metal atoms such as an aluminum and iron. Preferred examples of the organic amine group include alkanolamine groups such as ethanolamine group, diethanolamine group, and triethanolamine group, and triethylamine groups. Further, the organic amine group may be an ammonium group.

An unsaturated monocarboxylic acid monomer or an unsaturated dicarboxylic acid monomer is preferable as the above-mentioned monomer (I). The unsaturated monocarboxylic acid monomer is a monomer having, in the molecule, one unsaturated group and one group which can form a carboanion. Preferred examples of the unsaturated monocarboxylic acid monomer include acrylic acid, methacrylic acid, crotonic acid, α-hydroxy acrylic acid; monovalent metal salts thereof, divalent metal salts thereof, ammonium salts thereof; and organic amine salts thereof.

The above-mentioned unsaturated dicarboxylic acid monomer is a monomer having, in the molecule, one unsaturated group and two groups which can form a carboanion. Preferred examples of the unsaturated dicarboxylic acid monomer include maleic acid, itaconic acid, citraconic acid, fumaric acid, monovalent salts thereof, bivalent metal salts thereof, ammonium salts thereof, organic amine salt thereof, and anhydrides thereof.

As the above-mentioned monomer (I), in addition to the above, used may be half ester of an unsaturated dicarboxylic acid monomer with an alcohol containing 1 to 22 carbon atoms, half amide of an unsaturated dicarboxylic acid with an amine containing 1 to 22 carbon atoms, half ester of an unsaturated dicarboxylic acid monomer with a glycol containing 2 to 4 carbon atoms, and half amide of maleamic acid with a glycol containing 2 to 4 carbon atoms.

One or two or more species of the above-mentioned compounds may be preferably used as the above-mentioned monomer (I). Among them, (meth)acrylic acid (salts), maleic acid (salts), maleic anhydride, itaconic acid (salts), and α-hydroxy acrylic acid (salts) are preferred in view of high polymerizability, versatility, and the like. (Meth)acrylic acid and maleic acid (salts) are more preferable, and (meth)acrylic acid (salts) is still more preferable. The (meth)acrylic acid (salts) includes (meth)acrylic acid and partially or completely neutralized salts thereof, such as monovalent metal salts thereof, divalent metal salts thereof, ammonium salts thereof, and organic amine salts thereof.

Another monomer other than the above-mentioned monomer (I) (a monomer copolymerizable with the above-mentioned unsaturated carboxylic acid monomer (the monomer (I)), hereinafter, also referred to as monomer (II)) can be preferably used as the above-mentioned monomer component capable of producing the water-soluble polymer.

The above-mentioned monomer (II) is a monomer copolymerizable with the above-mentioned monomer (I). Examples of the monomer (II) include monoethylenically unsaturated monomers having a sulfonic acid group such as vinyl sulfonic acid, allyl sulfonic acid, 3-allyloxy-2-hydroxypropane sulfonic acid, isoprene sulfonic acid, 2-acrylamide methylpropane sulfonic acid, styrene sulfonic acid, and 2-sulfoethyl methacrylate; partially or completely neutralized salts thereof such as monovalent metal salts thereof, divalent metal salts thereof, ammonium salts thereof, and organic amine salts thereof; unsaturated hydrocarbons containing a hydroxyl group such as 3-methyl-2-butene-1-ol (simply referred to as prenol), 3-methyl-3-butene-1-ol (simply referred to as isoprenol), and (meth)allyl alcohol; and unsaturated polyalkylene glycol monomers in which an alkylene oxide is added to isoprenol or allyl alcohol.

A radical polymerizable monomer can be preferably used as the above-mentioned monomer (II). The radical polymerizable monomer is not especially limited as long as it is a radical polymerizable monomer. Preferred examples of the radical polymerizable monomer include (meth)acrylates, for example, mono(meth)acrylates such as methyl (meth)acrylate, ethyl (meth)acrylate, butyl (meth)acrylate, hexyl (meth)acrylate, 2-ethylhexyl (meth) acrylate, lauryl (meth)acrylate, tridecyl (meth)acrylate, stearyl (meth)acrylate, cyclohexyl (meth) acrylate, dimethylaminoethyl (meth)acrylate, ethylaminoethyl (meth)acrylate, glycidyl (meth)acrylate, tetrahydrofurfuryl (meth)acrylate, and allyl (meth)acrylate, and polyvalent (meth)acrylates such as triethylene glycol di(meth)acrylate, tetraethylene glycol di(meth)acrylate, pentyl glycol di(meth)acrylate, dipropyrene glycol di(meth)acrylate, trimethylolpropane di(meth)acrylate, trimethylolpropane tri(meth)acrylate, pentaerythritol tri(meth)acrylate, pentaerythritol tetra(meth)acrylate;

alkoxypolyalkylene glycol (meth)acrylates; polyalkylene glycol (meth)acrylates; α-(hydroxyalkyl)acrylic acids (salts), α-(hydroxypolyalkyleneoxymethyl)acrylic acids (salts); aromatic monomers such as styrene and α-methyl styrene; vinyl esters such as vinyl acetate and vinyl propionate; vinyl ethers such as hydroxymethyl vinyl ether, hydroxyethyl vinyl ether, hydroxypropyl vinyl ether, and hydroxybutyl vinyl ether; monomers having nitrogen atom-containing group such as N-vinylpyrrolidone and acryloyl morpholine; nitrile group-containing monomers such as (meth) acrylonitrile; amide monomers such as (meth) acrylamide and N-methylolacrylamide; carboxyl group-containing monomers such as itaconic acid, crotonic acid, maleic anhydride, and maleic acid; hydroxyl group-containing monomers such as 2-hydroxyethyl (meth)acrylate; and epoxy group-containing monomers such as glycidyl (meth)acrylate.

One or two or more species of them may be appropriately determined to be used as the above-mentioned monomer (II).

The mixed amount of the monomer (I) is 50 to 100 mol %, and preferably 70 to 100 mol %, and more preferably 90 to 100 mol %, relative to a total amount of the monomer. If the mixed amount of the monomer (I) is 50 mol % or more, the water-solubility often can be exhibited sufficiently, which is preferable. The upper limit of the mixed amount of the monomer (I) is 100 mol %, that is, (meth)acrylic acid (salts) may account for a total amount of the monomer. If acrylic acid (salts) and methacrylic acid (salts) are used in combination as the monomer (I), the mixed amount of the (meth)acrylic acid (salts) is preferably 50 mol % or less, and more preferably 0.5 to 40 mol %, and still more preferably 1 to 30 mol %.

The monomer (I) may be added in monomer (I) solution (preferably aqueous solution) form prepared by dissolving the monomer (I) in a solvent mentioned below or preferably in water. The concentration of the monomer (I) solution (preferably aqueous solution) is 30 to 75% by weight, and more preferably 35 to 70% by weight, and still more preferably 40 to 65% by weight if the monomer (I) is used as the monomer (I) solution. If the monomer (I) solution has a concentration within such a range, a product with a sufficient concentration can be produced, which is preferable in view of transportation and storage.

The mixed amount of the above-mentioned monomer (II) is preferably 0 to 50 mol %, and more preferably 0 to 30 mol %, and still more preferably 0 to 10 mol %, relative to a total amount of the monomer. If the mixed amount of the monomer (II) is 50 mol % or less, the obtained polymer can exhibit physical properties attributed to the monomer (II) only or together with the monomers (I) while keeping the water solubility. In contrast, the lower limit of the mixed amount of the above-mentioned monomer (II) is 0 mol %. That is, the water-soluble polymer may be either a homopolymer or a copolymer of the above-mentioned monomer (I) component.

The monomer (II) may be added in monomer (II) solution (preferably aqueous solution) form prepared by dissolving the monomer (II) in a solvent mentioned below or preferably in water. The concentration of the monomer (II) solution (preferably aqueous solution) is 10 to 100% by weight, and more preferably 20 to 95% by weight, and still more preferably 30 to 90% by weight if the monomer (II) is used as the monomer (II) solution. If the concentration of the monomer (II) solution is 10% by weight or more, a product with a sufficient concentration can be produced, which is preferable in view of transportation and storage. In contrast, the upper limit of the concentration is not especially limited, and the concentration may be 100% by weight (that is, the monomer (II) accounts for a total amount of the monomer, that is, solvent-free).

Examples of the above-mentioned solvent include water; monovalent alcohols such as methanol, ethanol, propanol, isopropyl alcohol, butanol, pentanol, hexanol, cyclohexanol, methyl cyclohexanol, and benzyl alcohol; polyalcohols and derivatives thereof such as ethylene glycol, propylene glycol, ethylene glycol diacetate, ethylene glycol dimethyl ether, ethylene glycol diethyl ether, ethylene glycol dibutyl ether, ethylene glycol monomethyl ether, ethylene glycol monoethyl ether, ethylene glycol monomethyl ether acetate, ethylene glycol monoethyl ether acetate, diethylene glycol, diethylene glycol diacetate, propylene glycol monomethyl ether, propylene glycol monoethyl ether, propylene glycol monobutyl ether, propylene glycol monomethyl ether acetate, and glycerin; amides such as dimethyl formaldehyde; ethers such as diethyl ether and dioxane; ketones such as acetone, methyl ethyl ketone, diisobutyl ketone, diisopropyl ketone, diethyl ketone, cyclohexanone, and methyl isobutyl ketone; ester solvents such as methyl acetoacetate, ethyl acetoacetate, methyl benzoate, ethyl benzoate, ethyl acetate, and butyl acetate; hydrocarbon solvents such as benzene, toluene, xylene, and cyclohexane. One or two or more species of them can be appropriately determined to be used.

Aqueous solvents such as water, alcohol, glycol, glycerin, and polyethylene glycol are preferable as the above-mentioned solvent. More preferred are aqueous solvents containing water and one or more solvent other than water. If the solvent other than water is used, the boiling point or the solubility can be adjusted, for example. The mixed ratio of water to the solvent other than water may be appropriately determined in consideration of solubility of the polymer, reactivity to the raw material, or the like. It is generally preferable that the mixed ratio is 10% by weight or less.

The use amount of the above-mentioned solvent is 40 to 200% by weight, and preferably 45 to 180% by weight, and more preferably 50 to 150% by weight, relative to a total amount of the monomer. If the use amount of the solvent is less than 40% by weight, the molecular weight becomes higher. In contrast, it is not preferable that the use amount of the solvent is more than 200% by weight, because the produced water-soluble polymers have a low concentration and therefore the solvent needs to be removed in some cases. Part of the solvent may be charged into the production apparatus at the initial stages of the polymerization, if needed. Part of the solvent may be appropriately added singly into the reaction system during the polymerization from the supply port of other components, for example. The solvent may be added into the reaction system during the polymerization, together with the monomer component, the initiator, or other additives, each previously dissolved in the solvent.

The ratio of the use amount of the solvent to that of the monomer is not especially limited. A total amount of the monomer is preferably 200 parts by weight or less, and more preferably 180 parts by weight or less, and still more preferably 160 parts by weight or less, relative to 100 parts by weight of the solvent.

Redox initiators, azo initiators, organic peroxides, optical initiators, and the like, are preferable as the polymerization initiator which can be used in the aqueous solution polymerization of the present invention. Specific examples of the polymerization initiator include persulfates such as sodium persulfate, ammonium persulfate and potassium persulfate; hydrogen peroxide; azo compounds such as 2,2'-azobis(2-aminodipropane)dihydrochloride, 4,4'-azobis(4-cyanovaleic acid), azobisisobutyl nitrile, and 2,2'-azobis(4-methoxy-2,4-dimethylvaleronitrile); and organic peroxides such as benzoyl peroxide, lauroyl peroxide, peracetic acid, persuccinic acid, di-t-butyl peroxide, t-butyl hydroperoxide, and cumene hydroperoxide. The polymerization initiator may contain one or two or more species of them. Among them, redox initiators, azo initiators, and organic peroxides are preferred. Specifically, persulfates, hydrogen peroxide, organic peroxides, 2,2'-azobis(2-aminodipropane)dihydrochloride are preferred. Persulfates, hydrogen peroxide, 2,2'-azobis(2-aminodipropane)dihydrochloride are more preferred. Persulfates, hydrogen peroxide, 2,2'-azobis(2-aminodipropane)dihydrochloride are still more preferred.

Metal simple substances containing a metal with a plurality of oxidation numbers as a constitutional component, salts thereof and/or complexes thereof are preferable as the above-mentioned polymerization initiator. As mentioned above, the preferable embodiments of the present invention include the continuous production method of the water-soluble polymer, wherein a metal simple substance containing a metal with a plurality of oxidation numbers as a constitutional component, a salt thereof and/or a complex thereof are/is added from at least one position of the circulation line. The metal with a plurality of oxidation numbers means a metal with a plurality of oxidation numbers when becoming ion, such as divalent or trivalent iron, monovalent or divalent copper, divalent or trivalent cobalt, and divalent, trivalent, or hexavalent chromium. With respect to the plurality of oxidation numbers, the species of the metal is not limited as long as the reaction is accelerated due to the plurality of oxidation number. It is preferable that metal simple substances containing a metal with two oxidation numbers as a constitutional component, salts thereof, and/or complexes thereof are more preferable, taking into consideration that the reaction system is not complicated. Preferred examples of a ligand of the metal complex include water (aquo complex), ammonia (ammonium complex), ethylenediamine, cyanogen (cyano complex), hydroxyl group (hydroxy complex), halogen (halogeno complex), cyclic ether, cyclic amine such as pyridine, fulleren, porphyrin, and, cyclopentadiene (metallocene).

Polyvalent metal compounds or simple substances are preferable as the above-mentioned "metal simple substance containing a metal with a plurality of oxidation numbers as a constitutional component, a salt thereof and/or a complex thereof". Specific examples thereof include water-soluble polyvalent metal salts such as vanadium trichloride oxide, vanadium trichloride, vanadyl oxalate, vanadyl sulfate, vanadic acid anhydride, ammonium methavanadate, hypovanadous ammonium sulfate [$(NH_4)_2SO_4 \cdot VSO_4 \cdot 6H_2O$], vanadous ammonium sulfate [$(NH_4)V(SO_4)_2 \cdot 12H_2O$], copper acetate(II), copper bromide(II), copper(II)acetylacetate, ammonium cupric chloride, ammonium copper chloride, copper carbonate, copper(II) chloride, cupric citrate (II), copper formate (II), copper hydroxide (II), copper nitrate, copper naphthenate, copper oleate (II), copper maleate, copper phosphate, copper (II) sulfate, cuprous chloride, copper (I) cyanide, copper iodinate, copper (I) oxide, copper thiocyanate, iron acetylacetonate, ferric ammonium citrate, oxalic acid ferric iron ammonium, ammonium iron sulfate (Mohr's salt), ferric ammonium sulfate, citric acid iron, fumaric acid iron, maleic acid iron, ferrous lactate, a ferric nitrate, iron pentacarbonyl, ferric phosphate, and ferric pyrophosphate; polyvalent metal oxide such as vanadium pentoxide, copper II oxide, ferrous oxide, and ferric oxide; polyvalent metal sulfides such as iron sulfide (III), iron sulfide (II), and copper sulfide; copper powders; and iron powders. One or two more species of them is/are preferable. These may be in hydrated form. Sulfates, halides, and aqueous complexes are more preferable in view of easy procurement and economical efficiency. Sulfates and aqueous complexes are still more preferable.

The above-mentioned "metal simple substance containing a metal with a plurality of oxidation numbers as a constitutional component, a salt thereof and/or a complex thereof" are/is preferably supplied into the circulation line from the above-mentioned polymerization initiator supply port. The placed position, the placed number, and the like, of the polymerization initiator supply port are as mentioned above.

As the polymerization initiator used in the polymerization reaction if the above-mentioned monomer is polymerized in the aqueous solution, mentioned may be the following combinations: persulfate and sulfite; persulfate and hydrogen peroxide; sulfite and oxygen; and polyvalent metal ion and one or two more of these initiators (for example, "iron and hydrogen peroxide", "iron and persulfate", and "iron and persulfate and sulfite"). Among them, "persulfate and sulfite", "persulfate and hydrogen peroxide", "polyvalent metal ion and persulfate and sulfite", are preferable. More preferred is "polyvalent metal ion and persulfate and sulfite".

Specifically, compounds mentioned as a heavy metal-containing compound mentioned below are preferable as the above-mentioned polyvalent metal ion. Specific examples of the polyvalent metal ion include: aqueous polyvalent metal salts such as vanadium trichloride oxide; polyvalent metal oxides such as vanadium pentoxide; polyvalent metal sulfides such as iron sulfide (III); complexes containing a polyvalent metal such as ammonium iron sulfate (Mohr's salt); and metal simple substances such as copper powders. Among them, ammonium iron sulfate (Mohr's salt) is preferable. That is, a combination of "complex containing a polyvalent metal and persulfate and sulfite" is more preferable, as the above-mentioned polymerization initiator, and a combination of "ammonium iron sulfate (Mohr's salt) and persulfate and sulfite" is still more preferable. Specifically, preferable is a configuration in which ammonium iron sulfate (Mohr's salt) is combined with sodium persulfate, and sodium hydrogensulfite (bisulfite).

It is particularly preferable that one or more species of the persulfate and one or more species of the bisufite are combined to be used, because water-soluble polymers excellent in dispersibility or chelating ability and having a low molecular weight can be produced. If the bisulfite in addition to the persulfate is added into the initiator, the obtained water-soluble polymer is suppressed from having a high molecular weight more than needed, and thereby the molecular weight of the polymer can be adjusted.

The reaction rate can be significantly improved if the persulfate and the bisulfite are used in combination with the metal simple substance containing a metal with a plurality of oxidation numbers as a constitutional component, the salt thereof and/or the complex thereof. If Mohr's salt is used in combination with the persulfate and the bisulfite, for example, the molecular weight of the obtained water-soluble polymer can be easily specified. In addition, water-soluble polymers with a desired molecular weight can be produced because the bisulfite can perform deoxidization. The polymerization rate of the water-soluble polymer can be increased. If a polyacrylic acid and/or a salt thereof are/is produced as the water-soluble polymer, for example, 90% or more of acrylic acid and/or a salt thereof can be converted into the polyacrylic acid and/or the salt thereof in 30 seconds.

Specific examples of the persulfate include sodium persulfate (sodium peroxodisulfuric acid), potassium persulfate, and ammonium persulfate. Specific examples of the bisufite include sodium bisulfite, potassium bisulfite, and ammonium bisulfite. Sulfites, pyrosulfites, and the like may be used instead of the bisulfite.

With respect to the addition ratio of the persulfate to the bisulfite, the bisulfite is 0.5 to 5 parts by weight, and preferably 1 to 4 parts by weight, and more preferably 1.25 to 3 parts by weight, relative to 1 part by weight of the persulfate. If 0.5 parts by weight or more of the bisulfite relative to 1 part by weight of the persulfite is used, sufficient effects attributed to the bisulfite can be obtained and the weight average molecular weight of the water-soluble polymer can be sufficiently lowered. In contrast, if 5 parts by weight or less of the bisulfite relative to 1 part by weight of the persulfite is used, sufficient effects attributed to the addition of the bisulfite can be obtained, and over supply of the bisulfite can be suppressed. Accordingly, generation of sulfurous acid gas caused by decomposition of excessive bisulfite in the polymerization reaction system can be suppressed. Further, reduction in performances of the obtained water-soluble polymer or impurity deposit during storage at low temperatures can be effectively prevented, and no impurity precipitation is caused during storage at low temperatures, which is preferable.

In the combination use of the metal simple substance containing a metal with a plurality of oxidation numbers as a constitutional component, the salt thereof and/or the complex thereof, the bisulfite is preferably 20% by weight or less, relative to 100% by weight of the persulfate. If the bisulfite is more than 20% by weight, the effects such as reaction acceleration are kept, which may be economically inefficient. Further, the water-soluble polymer may be colored depending on the metal salt or the complex to be added and conditions such as pH, which possibly causes undesirable results. The bisulfite is more preferably 0.2% by weight or less, and still more preferably 0.02% by weight.

With respect to the addition amount of the persulfate and the bisulfite as the polymerization initiator, a total amount of the persulfate and the bisulfite as the initiator is preferably 2 to 20 g, and more preferably 4 to 15 g, and still more preferably 6 to 12 g, and particularly preferably 6 to 9 g, relative to 1 mole of the monomer. In the present invention, the persulfate and the bisulfite may be added within such a range of low addition amount, which can reduce generation of impurities. Further, reduction in performances of the obtained water-soluble polymer and impurity precipitation during storage at low temperatures can be prevented. If the addition amount of the persulfate and the bisulfite in the above-mentioned polymerization initiator is within 2 to 20 g, polymers with an excellent molecular weight can be effectively produced without adverse influence, such as reduction in purity of the obtained water-soluble polymer.

In the combination use of the metal simple substance containing the metal with the plurality of oxidation numbers as a constitutional component, the salt thereof and/or the complex thereof, the addition amount of the metal simple substance, the salt thereof and/or the complex thereof is preferably 1.5% by weight or less, relative to 100% by weight of the monomer. If the addition amount thereof is more than 1.5% by weight, the effect such as reaction acceleration is kept, which may be economically inefficient. Further, the water-soluble polymer may be colored depending on the metal salt or the complex to be added and conditions such as pH, which possibly causes undesirable results. The addition amount thereof is more preferably 0.015% by weight or less, and still more preferably 0.0015% by weight.

The above-mentioned persulfate as one species of the above-mentioned polymerization initiator may be added in persulfate solution (preferably aqueous solution) form, by being dissolved in the above-mentioned aqueous solvent. The concentration of the persulfate solution (preferably aqueous solution) is 1 to 35% by weight, and preferably 5 to 35% by weight, and more preferably 10 to 30% by weight, if the persulfate is used as the solution. If the concentration is less than 1% by weight, the concentration of the product reduces, which complicates the transportation and the storage. In contrast, if the concentration of the persulfate solution is more than 35% by weight, the persulfate may be precipitated.

The bisulfite as one of the above-mentioned polymerization initiator may be added in bisulfite solution (preferably aqueous solution) form, by being dissolved in the above-mentioned aqueous solvent. The concentration of the bisulfite solution (preferably aqueous solution) is 10 to 40% by weight, and preferably 20 to 40% by weight, and more preferably 30 to 40% by weight if the bisulfite is used as the solution. If the bisulfite solution has a concentration within the above-mentioned range, a product with a sufficient concentration can be produced without precipitation of the bisulfite, which is preferable in view of transportation and storage.

In the present invention, it is preferable that one or two or more species of the persulfate and hydrogen peroxide are used in combination. In some cases, a chain transfer agent or a polyvalent metal ion may be used (the polyvalent metal ion acts as a decomposition accelerator of the polymerization initiator), and both of them may be used simultaneously.

Hereinafter, specific explanation will be given. Specific examples of the persulfate include sodium persulfate, potassium persulfate, and ammonium persulfate. Preferable is sodium persulfate.

The addition amount of the above-mentioned hydrogen peroxide is preferably 2.0 to 10.0 g, and more preferably 3.0 to 8.0 g, relative to 1 mol of the monomer. If the addition amount of the hydrogen peroxide is 2.0 g or more, (meth) acrylic acid (salt) polymers with a sufficiently lowered weight average molecular weight can be produced. If the addition amount of the hydrogen peroxide is 10.0 g or less, sufficiently effective effects attributed to the hydrogen peroxide can be obtained without adverse effect caused by the residual hydrogen peroxide.

The addition amount of the above-mentioned persulfate is preferably 1.0 to 5.0 g, and more preferably 2.0 to 4.0 g, relative to 1 mol of the monomer. If the addition amount of the persulfate is 1.0 g or more, (meth)acrylic acid (salt) polymers with a sufficiently lowered molecular weight can be produced. If the addition amount of the persulfate is 5.0 g or less, sufficiently effective effects attributed to the persulfate can be obtained without causing reduction in purity of (meth)acrylic acid (salt) polymers to be obtained.

With respect to the addition ratio of the above-mentioned hydrogen peroxide and the above-mentioned persulfate, the weight of the persulfate is preferably 0.1 to 5.0 and more preferably 0.5 to 3.0 if the weight of the hydrogen peroxide is defined as 1 in terms of ratio by weight. If the persulfate is 0.1 or more ratio by weight, the weight average molecular weight of (meth)acrylic acid (salt) polymer to be obtained can be sufficiently lowered. If the persulfate is 5.0 or less ratio by weight, effects attributed to the addition of the persulfate can be sufficiently obtained.

In the present invention, another initiator (including a chain transfer agent) may be appropriately used if needed, unless having an adverse influence on the functional effects of the present invention. In the present invention, the above-mentioned combination of the persulfate and the bisulfite is preferably used as the initiator, but the initiator is not especially limited to this combination. That is, the above-mentioned initiator may be used, or other initiators may be used, or another initiator and the above-mentioned initiator may be used in combination as long as the functional effects of the present invention are exhibited. Examples of another initiator (including a chain transfer agent) include azo compounds such as 2,2'-azobis(2-amidinopropane)hydrochloride, 4,4'-azobis(4-cyanovaleic acid), azobisisobutyl nitrile, and 2,2'-azobis(4-methoxy-2,4-dimethylvaleronitrile); organic peroxides such as benzoyl peroxide, lauroyl peroxide, peracetic acid, di-t-butyl peroxide, t-butyl hydroperoxide, and cumene hydroperoxide; and hydrogen peroxide.

The above-mentioned another initiator may be added in aqueous solution form, by being dissolved in the above-mentioned aqueous solvent. If the another initiator is used as the aqueous solution, the concentration is appropriately determined unless the functional effects of the present invention are sacrificed, and generally determined based on the comparable level of the above-mentioned concentration of the persulfate or bisulfite solution.

A chain transfer agent may be used as the another initiator. Use of the chain transfer agent makes it possible to control the molecular weight of the polymer. The chain transfer agent is not especially limited. Used may be sulfurous acid (salts), hydrogen sulfite (salts), pyrosulfurous acid (salts), phosphorous acid (salts), phosphinic acid (salts), thioglycolic acid, octyl thioglycolate, thiopropionate, octyl thiopropionate; mercapto group-containing compounds such as n-dodecyl mercaptan, t-dodecyl mercaptan, ethylene glycol dithioglycolate, ethylene glycol dithiopropionate, 1,4-butanediol thioglycolate, trimethylol propane trithioglycolate, trimethylol propane trithiopropionate, pentaerythritol tetrakisthioglycolate, pentaerythritol tetrakisthiopropionate, dipentaerythritol hexakisthioglycolate, and dipentaerythritol hexakisthiopropionate; mercaptan compounds such as butanethiol, octanethiol, decanethiol, hexadecane thiol, octadecane thiol, cyclohexylmercaptan, thiophenol, mercaptoethanol, thioglycerol, thiomalic acid, and 2-mercaptoethanesulfonic acid; and secondary alcohols such as isopropanol, and glycerin.

As another additive other than the above-mentioned initiator which can be used in the polymerization reaction if the above-mentioned monomer is polymerized in the aqueous solution, a proper amount of a suitable additive may be added unless affecting the functional effects of the present invention. Heavy metal-containing compounds, organic peroxides, and, $H_2O_2$ and metal salt, are preferably used, for example. Use of such additives makes it possible to accelerate the reaction. Therefore, addition of such additives is preferable in view of production efficiency. As the above-mentioned heavy metal-containing compounds, used may be compounds mentioned in the above-mentioned "metal simple substance containing a metal with a plurality of oxidation numbers as a constitutional component, a salt thereof and/or a complex thereof".

It is preferable that the water-soluble polymer obtained in the present invention has a heavy metal ion concentration of 0.05 to 10 ppm. Therefore, it is preferable that a proper amount of the above-mentioned heavy metal-containing compound is added, if needed. Further, use of a SUS (stainless) container, a SUS stirrer, or the like, is advantageous in view of cost effectiveness because an extremely small amount and a proper amount specified mentioned above of heavy metal ions, particularly iron ions, leaches into (supplied into) the reaction liquid from the SUS which is a material of the container and the like under the production conditions of the present invention. In the production method of the present invention, the same functional effects as in addition of the above-mentioned heavy metal-containing compound can be exhibited if a reaction apparatus, such as the SUS reaction container or the SUS stirring blade, is used. Existing reaction containers made of steel or copper may be used, but many heavy metal ions may leach. In this case, the heavy metal ions cause coloring, and therefore an operation for removing such heavy metal ions is needed, which is economically inefficient. Reaction containers provided with glass lining processing may be used, and a heavy metal-containing compound may be used if necessary.

In the production method of the present invention, the above-mentioned polymerization reaction of the monomer can be performed under any conditions of acid, neutral, or alkaline condition, depending on the initiator to be used. If the persulfate is used as the initiator, for example, the polymerization reaction is preferably performed under low pH condition. If the hydrogen peroxide is used, the polymerization reaction is preferably performed under high pH condition. As mentioned above, the pH range in the above-mentioned polymerization reaction of the monomer is not especially limited. If the polymerization reaction is performed in an acidic region, increase in viscosity of the aqueous solution in the polymerization reaction system can be suppressed, and therefore, water-soluble polymers with a low molecular weight can be produced well.

As the above-mentioned alkali chemical (also referred to as pH adjustor or neutralizer) for adjusting the pH of the reaction liquid in the polymerization or for neutralizing the monomer, mentioned may be hydroxides of alkali metals such as sodium hydroxide and potassium hydroxide, hydroxides of alkaline earth metals such as calcium hydroxide and magnesium hydroxide, organic amine salts such as ammonia, monoethanolamine, and triethanolamine. These may be used singly or in combination of two or more species of them. Among them, hydroxides of alkali metals such as sodium hydroxide and potassium hydroxide and ammonia are preferably, and sodium hydroxide and ammonia are more preferred.

The neutralization degree in the polymerization is 1 to 25 mol %. If only the above-mentioned monomer (I) is used for the polymerization, the neutralization degree is preferably 2 to 15 mol %, and more preferably 3 to 10 mol %. If the monomer (II) in addition to the above-mentioned monomer (I) is used for the polymerization, part of or all of the monomer (II) may be initially charged, and, in this case, the neutralization degree in the polymerization is preferably 1 to 25 mol %, and more preferably 3 to 10 mol %. If the neutralization degree in the polymerization is within such a range, the polymerization or the copolymerizaion can be most excellently performed even if only the above-mentioned monomer (I) is used, or the monomer (I) and the monomer (II) are copolymerized. And polymers with a low molecular weight can be produced well without increase in viscosity of the aqueous solution in the polymerization reaction system. Further, the polymerization reaction can be made proceed under higher concentration condition than before, and therefore the production efficiency can be significantly improved. The neutralization degree in the polymerization of 1 mol % or more is preferable because the amount of sulfurous acid gas generated can be excellently suppressed, and the molecular weight of the obtained polymer can be lowered. If the neutralization degree in the polymerization is 25 mol % or less, sufficient chain transfer efficiency attributed to the bisulfite can be obtained, and thereby the molecular weight of the obtained polymer can be sufficiently lowered and increase in viscosity of the aqueous solution in the polymerization reaction with proceeding of the polymerization can be suppressed. Therefore, polymers with a low molecular weight can be produced without excessive increase of the molecular weight. Further, the above-mentioned effect attributed to the reduction in neutralization degree can be sufficiently exhibited, and impurities can be reduced.

The neutralization method is not especially limited. Alkaline monomer (I) components such as sodium (meth)acrylate may be used as the neutralizer, for example. Hydroxides of alkali metals such as sodium hydroxide may be used, and these may be used in combination. As the additional form at the neutralization, the neutralizer may be in solid form or in solution form (preferably aqueous solution form), by being dissolving in a suitable solvent or preferably in water. If the aqueous solution is used, the concentration of the aqueous solution is preferably 10 to 60% by weight, and more preferably 20 to 55% by weight, and still more preferably 30 to 50% by weight. If the concentration of the aqueous solution is 10% by weight or more, a product with an excellent concentration can be produced, which is preferable in view of transportation and storage. In contrast, the concentration of 60% by weight or less is preferable because neither precipitation nor increase in viscosity is caused, so sending solution and liquid-liquid mixing can be easily operated.

At the polymerization, generally, the above-mentioned monomer, the above-mentioned persulfate and bisulfite as the initiator, and the above-mentioned another additive are previously dissolved in suitable solvents (preferably, the same kind of solvents as the reaction solvent), thereby being a monomer solution, a polymerization initiator solution, and another additive solution, respectively. It is preferable that the polymerization is performed while each of the solutions is continuously added into the (aqueous) solvent (adjusted to a predetermined temperature if needed) charged in the production apparatus (reaction container) from predetermined supply ports over predetermined additional times. Part of the solvent may be previously charged in the production apparatus on the reaction system, or may be added later. The production method of the present invention is not limited thereto. For example, the solution may be continuously added, or may be intermittently added in several portions. Part of or all of the monomer (II) may be initially charged (that is, it can also be considered that all or part of the monomer (II) is added at the beginning of the polymerization at one time). The addition rate (addition amount) of the monomer (II) may be constant rate (constant amount) from beginning to end of the addition, or the addition rate (supplied amount) may be varied over time depending on the polymerization temperature and the like. Among the additional components, the starting time or the termination time may be varied, or the additional time may be shortened or prolonged. As mentioned above, the production method of the present invention is appropriately changeable unless the functional effects of the present invention are sacrificed. If each of the components is added in solution form, the additional solution may be heated to the temperature equal to the polymerization temperature in the reaction system. Thereby, the temperature hardly varies and thereby can be easily controlled if the polymerization temperature is kept constant.

If the above-mentioned monomer (I) and/or the above-mentioned monomer (II) are/is copolymerized, the additional time is controlled depending on the polymerizability of the monomer(s). If monomers with low polymerizability, for example, the additional time may be shorten. Part of or all of the monomers may be previously charged in the production apparatus.

Further, with respect to the bisulfite, the molecular weight at the initial stages of the polymerization has a great influence on the final molecular weight. Therefore, 5 to 20% by weight of the bisulfite or the solution thereof is preferably added within 60 minutes, preferably 30 minutes, and more preferably 10 minutes from the start of the polymerization in order to reduce the initial molecular weight, which is effective if the polymerization is started from a room temperature.

With the additional time of the bisulfite or the solution thereof among the additional components at the polymerization, the addition of the bisulfite or the solution thereof is preferably terminated 1 to 30 minutes, preferably 1 to 20 minutes, more preferably 1 to 15 minutes earlier than termination of the addition of the monomer (I) or the solution thereof. Thereby, the bisulfite amount after termination of the polymerization can be reduced, and generation of sulfurous acid gas or formation of impurities each caused by the bisulfite can be usefully and effectively suppressed. Therefore, impurities formed by dissolution of sulfurous acid gas of the gas phase portion in the liquid phase can be dramatically reduced. If the bisulfite remains after the termination of the polymerization, impurities are generated, which causes reduction in performances of the polymer, impurity precipitation during storage at low temperatures. Therefore, it is preferable that the initiator containing the bisulfite has been consumed and has not remained at the end of the polymerization.

If the bisulfite (solution) addition is terminated only less than 1 minutes earlier than termination of the addition of the monomer (I) (solution), the bisulfite may remain after the completion of the polymerization. Such a case includes a case in which the addition of the bisulfite or the solution thereof and the addition of the monomer (I) (solution) are simultaneously terminated, and a case in which the addition of the bisulfite or the solution thereof is terminated later than termination of the monomer (I) (solution) addition. In such cases, it becomes difficult to usefully and effectively suppress generation of sulfurous acid gas or formation of impurities, and the residual initiator may have an adverse influence on the thermal stability of the obtained polymer. In contrast, the bisulfite has been consumed before the termination of the polymerization if the addition of the bisulfite or the solution is terminated more than 30 minutes earlier than termination of the monomer (I) (solution) addition. Therefore, increase in the molecular weight may be caused. In addition, the additional rate of the bisulfite in the polymerization is faster than that of the monomer (I) (solution), and much bisulfite is added for a short time. Therefore, during this additional period, a lot of impurities and much sulfurous acid gas may be generated.

Among the additional components at the polymerization, the persulfate (solution) addition is terminated 1 to 30 minutes, and preferably 1 to 20 minutes, and more preferably 1 to 15 later than termination of the monomer (I) (solution) addition. Thereby, the impurities due to residual monomer can be reduced dramatically, for example, the residual amount of the monomer components after the completion of the polymerization can be reduced.

If the persulfate (solution) addition is terminated only less than 1 minutes later than termination of the monomer (I) (solution) addition, the monomer component may remain after the completion of the polymerization. Such a case includes a case in which the persulfate (solution) addition and the monomer (I) (solution) addition are simultaneously terminated, and a case in which the persulfate (solution) addition is terminated earlier than termination of the monomer (I) (solution) addition. In such cases, it becomes difficult to suppress formation of impurities usefully and effectively. In contrast, if the persulfate (solution) addition is terminated more than 30 minutes later than termination of the monomer (I) (solution) addition, the persulfate or decomposition products thereof remains after the completion of the polymerization, and impurities may be formed.

The solid matter concentration (that is, the polymerization solid matter concentration of the monomer) in the aqueous solution after each of the above-mentioned components has been added and the polymerization reaction in the polymerization reaction system have been completed is 35% by weight or more, and preferably 40 to 70% by weight, and more preferably 45 to 65% by weight. If the solid matter concentration after the completion of the polymerization is 35% by weight or more, the polymerization can be performed at a high concentration and in one step. Therefore, water-soluble polymers with a low molecular weight can be effectively obtained. For example, a concentration step, which is needed in some cases in conventional production methods, can be omitted. Therefore, the production efficiency can be significantly improved. Thereby, the productivity of the water-soluble polymer can be significantly improved, which makes it possible to suppress increase in production costs.

If the above-mentioned solid matter concentration is less than 35% by weight, the productivity in the water-soluble polymer can be significantly improved. For example, the concentration step is difficult to omit.

If the solid matter concentration in the polymerization reaction is higher, the following problems occur in conventional methods: increase in viscosity of the reaction liquid with proceeding of the polymerization reaction becomes pronounced, and thereby the weight average molecular weight of the obtained polymer becomes significantly higher. However, the polymerization reaction can suppress the increase in viscosity of the reaction liquid with proceeding of the polymerization reaction, if the polymerization reaction proceeds on the acid side (pH at 25° C. is 1 to 6, and the neutralization degree of 1 to 25 mol %). Therefore, polymers with a low molecular weight can be obtained even if the polymerization reaction is performed under a high concentration condition, and the production efficiency can be significantly improved. The above-mentioned "when the polymerization reaction has been completed" means when the reaction liquid has been discharged from the discharge line.

In the production method of the water-soluble polymer according to the present invention, the discharge line is provided with an alkaline chemical supply port. Thereby, the neutralization degree (final neutralization degree) of the obtained water-soluble polymer can be determined to a predetermined range, if necessary, by appropriately adding a suitable alkaline component.

The above-mentioned final neutralization degree is not especially limited because it varies depending on the application, and can be determined to an extremely wide range of 1 to 100 mol %. The water-soluble polymer may be used as an acidic polymer without being neutralized if used as a detergent builder such as a weak acidic detergent, which is considered to be kind to bare skin. The water-soluble polymer may be neutralized so as to have a neutralization degree of 90 mol % or more with an alkaline component in a post treatment if used in a neutral detergent or an alkaline detergent, and the like. The water-soluble polymer preferably has a final neutralization degree of 1 to 75 mol %, and more preferably 5 to 70 mol %, particularly if used as an acidic polymer. The water-soluble polymer preferably has a final neutralization degree of 75 to 100 mol %, and more preferably 85 to 99 mol %, if used as a neutral or alkaline polymer. If the water-soluble polymer has a final neutralization degree of more than 99 mol % when used as a neutral or alkaline polymer, the polymer aqueous solution may be colored.

One or two or more species of the above-mentioned alkaline chemicals may be used as the above-mentioned alkaline component.

The present invention comprises also a water-soluble polymer comprising a polyacrylic acid and/or a salt thereof having a sulfur atom and/or a phosphorus atom at a terminal, wherein the polyacrylic acid and/or the salt thereof has a peak top molecular weight of 100 to 50000, and an integrated intensity in a section between a retention time showing a molecular weight of 2500 and a retention time showing a molecular weight of 7000 in gel permeation chromatography, the molecular weight being measured through a calibration curve prepared by using standard sodium polyacrylate, accounts for 38.0% or more, relative to a total integrated intensity of the polyacrylic acid and/or the salt thereof.

The above-mentioned water-soluble polymer comprises a polyacrylic acid and/or a salt thereof having a sulfur atom and/or a phosphorus atom at a terminal of the main chain of the polymer, and may contain another constitutional component. The sulfur atom and/or the phosphorus atom derived from the chain transfer agent by which molecular weight of the polymer can be controlled is/are introduced into the terminal of the main chain of the polymer. The polyacrylic acid and/or the salt thereof have/has a sulfur atom and/or a phosphorus atom at a terminal of the main chain, so the polymerization can be made to proceed fast if the water-soluble polymer is produced. The water-soluble polymer with a desired molecular weight can be easily produced by varying the addition amount.

In the above-mentioned polyacrylic acid and/or the salt thereof, a polymer amount included within a specific molecular weight range accounts for 38.0% or more. If the polymer amount accounts for less than 38.0%, excellent clay dispersibility can not be obtained, and such a water-soluble polymer may not be preferably used in various applications such as builder. The polymer amount more preferably accounts for 39.0% or more, and still more preferably 39.5% or more, and most preferably 40.0% or more, and particularly preferably 41.0% or more. Among them, sufficient clay dispersibility can be exhibited if the polymer amount included within the above-mentioned molecular weight range accounts for 41.0% (area %) or more.

The upper limit of the polymer amount included within the above-mentioned specific molecular weight range is 100.0%. The above-mentioned polymer amount accounts for 38.0% or more, and the upper limit thereof is not especially limited in the present invention, but preferably 80.0% or more in view of productivity. If the above-mentioned polymer amount accounts for 100.0%, for example, an operation such as dialysis for removing polymers beyond the range for increase in content, or an operation for preventing production of polymers beyond the range, is needed. In contrast, if the polymer amount accounts for 80.0% or less, the above-mentioned operation can be omitted or simplified, and thereby the polymers can be produced with high productivity. Sufficient high clay dispersibility can be exhibited even if the polymer amount is within such a range. That is, the water-soluble polymer can be excellent in both of the clay dispersibility and the productivity if the polymer amount accounts for 80.0% or less. The upper limit of the polymer amount is more preferably 70.0% or less, and still more preferably 65.0% or less.

The above-mentioned polymer content is an area ratio measured by gel permeation chromatography (GPC), and can be measured through [an integrated intensity of a polyacrylic acid and/or the salt thereof in a section between a retention time showing a molecular weight of 2500 and a retention time showing a molecular weight of 7000, the molecular weight being measured through a calibration curve prepared by using standard sodium polyacrylate]/[a total integrated intensity of the above-mentioned polyacrylic acid and/or the salt thereof]×100. In the polyacrylic acid and/or the salt thereof belonging to the retention time showing a molecular weight of less than 2500, the obtained water-soluble polymer has a low dispersibility. In the polyacrylic acid and/or the salt thereof belonging to retention time of a molecular weight of more than 7000, if the metal atom coexists, the polymer is cross-linked with the metal atom, and thereby insolubilized. Therefore, such a water-soluble polymer may not be preferably used in various applications mentioned below.

Figure 6:
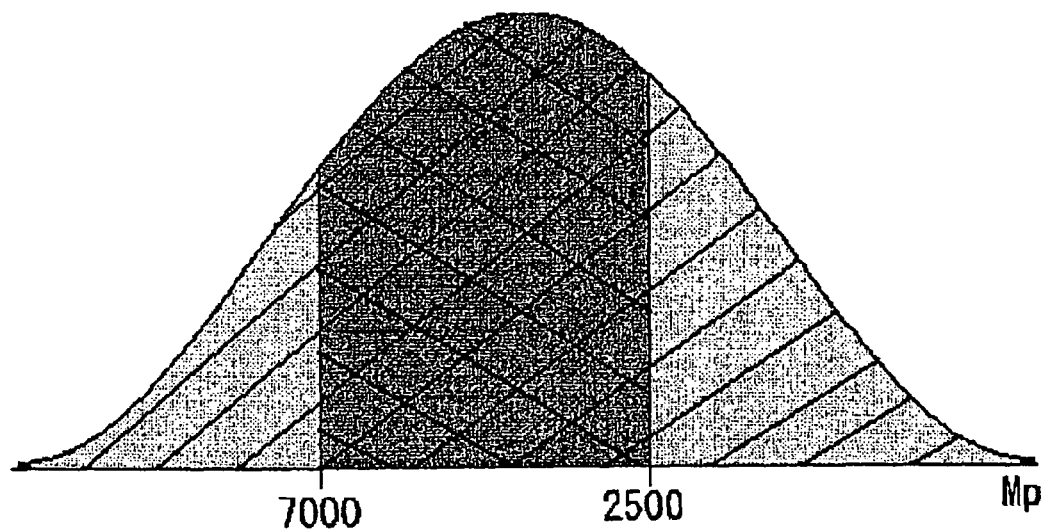
[FIG. 6]

With respect to the above-mentioned area ratio, as shown in a conceptual diagram of FIG. 6, for example, the mesh part shows an integrated intensity of a polyacrylic acid and/or a salt thereof in a section between a retention time showing a molecular weight of 2500 and a retention time showing a molecular weight of 7000, the molecular weight being measured through a calibration curve prepared by using standard sodium polyacrylate, and the shadow part shows a total integrated intensity of the above-mentioned polyacrylic acid and/or the salt thereof.

The measurement conditions of the above-mentioned gel permeation chromatography are preferably as mentioned above. The calibration curve prepared by using standard sodium polyacrylate is prepared for example by measuring standard sodium polyacrylate having a peak top molecular weight (Mp) of 900 to 47500 under the same conditions as the GPC measurement condition of the above-mentioned polyacrylic acid and/or the salt thereof. The calibration curve represents a relationship between the retention time and the molecular weight. The above-mentioned integrated intensity of the polyacrylic acid and/or the salt thereof is calculated by dividing the area in the section corresponding to 2500 to 7000 of Mp based on the calibration curve by the area of the entire section.

The above-mentioned water-soluble polymer comprises a polyacrylic acid and/or a salt thereof, and is not especially limited as long as the functional effects of the present invention can be exhibited. The above-mentioned water-soluble polymer may contain another component. Examples of the another component includes organic substances or inorganic substances derived from the initiator, the transfer agent and the like, residual monomers, additional reaction substances derived from the residual monomers. It is preferable that the content ratio of the above-mentioned polyacrylic acid and/or the salt thereof is 90 mol or more in 100 mol of the water-soluble polymer. If the content ratio thereof is less than 90 mol, the functional effects of the present invention may be insufficiently exhibited. The content ratio thereof is more preferably 95 mol or more. It is still more preferable that the water-soluble polymer consists of the polyacrylic acid and/or the salt thereof. As mentioned above, the preferable embodiments of the present invention include a polyacrylic acid and/or a salt thereof in which sulfur and/or phosphorus are/is bonded to a terminal of a polymer, wherein an integrated intensity in a section between a retention time showing a molecular weight of 2500 and a retention time showing a molecular weight of 7000 in gel permeation chromatography, the molecular weight (Mp) being measured based on a calibration curve prepared by using standard sodium polyacrylate, accounts for 38.0% or more relative to a total integrated intensity of the entire polymer.

It is preferable that the polyacrylic acid and/or the salt thereof show(s) a clay dispersibility of 0.85 or more. The polyacrylic acid and/or the salt thereof having a clay dispersibility of less than 0.85 may not be preferably used in various applications such as detergent, water treatment agent, and dispersant. The clay dispersibility is more preferably 0.88 or more, and still more preferably 0.90 or more.

It is preferable that the polyacrylic acid and/or the salt thereof have/has a number average molecular weight of 2000 to 3000. If the number average molecular weight is less than 2000, the dispersibility may be insufficient. If the number average molecular weight is more than 3000, insolubilization due to the polyvalent metal may be caused.

The above-mentioned water-soluble polymer is not especially limited as long as the above-mentioned effects are exhibited, and preferably produced by the above-mentioned production method. That is, the preferable embodiments of the present invention include an embodiment in which the above-mentioned water-soluble polymer is a water-soluble polymer produced by the continuous production method of a water-soluble polymer, comprising the steps of: circulating a circulation liquid containing a monomer having a polymerizable unsaturated bond through a reaction apparatus having a tank and a circulation line comprising a piping circulating outside the tank, and thereby producing a water-soluble polymer continuously; and discharging part of the circulation liquid from a discharge line. If water-soluble polymers are produced by the above-mentioned production method, water-soluble polymers having performances higher than those in polymers produced by conventional production methods can be stably produced with high productivity.

Further, the present invention is a detergent, a water treatment agent, or a dispersant comprising the water-soluble polymer. That is, the preferable embodiments of the present invention include a detergent, a detergent composition, a water treatment agent, and/or a pigment dispersant:

wherein a polyacrylic acid and/or a salt thereof has a sulfur atom and/or a phosphorus atom at a terminal, an integrated intensity of the polyacrylic acid and/or a salt accounts for 38.0% or more, in a section between a retention time showing a molecular weight of 2500 and a retention time showing a molecular weight of 7000 in gel permeation chromatography, the molecular weight (Mp) being measured based on a calibration curve prepared by using standard sodium polyacrylate, relative to a total integrated intensity of the entire polymer;

the dispersibility in the above-mentioned clay dispersity test is 0.85 or more; and the number average molecular weight (Mn) is 2000 to 3000.

The above-mentioned water-soluble polymer may be a water soluble polymer produced by the production method of the present invention or by another production method. The above-mentioned detergent composition means an additive for detergents, a detergent, a builder for detergents (detergent builder), or a cleaning agent.

The above-mentioned detergent builder exhibits functions for preventing soils from redepositing on clothes and the like under cleaning. If the water-soluble polymer prevents the redeposition of soils, it is preferable that in addition to the function of making the detergent component sufficiently operate by removing the polyvalent metal ion in the system by the carboxyl group, the following function is exhibited: a function of reducing the affinity with soils when the polymer has a hydrophobic terminal structure; or a function of dispersing soils when the polymer has a hydrophilic terminal structure.

The above-mentioned detergent builder is excellent in compatibility with a surfactant and can form a highly concentrated liquid detergent. Therefore, such a detergent builder can be preferably used as a builder for liquid cleaning agents. A liquid detergent prepared by using the detergent builder shows excellent transparency because the detergent builder is excellent in compatibility with a surfactant. Therefore, a problem of separation of the liquid detergent, caused by turbidity, can be prevented. The detergent builder forms a highly concentrated liquid detergent because of the excellent compatibility, and therefore can improve the detergency of the liquid detergent.

The above-mentioned detergent builder can be a detergent builder excellent in anti-redeposition capability and further having agent performances with extremely high quality and excellent in stability in which reduction in the performances after storage for a long period or impurity precipitation during storage at a low temperature is hardly caused.

A composition component other than the water-soluble polymer or a mixed ratio thereof in the above-mentioned detergent builder may be appropriately adopted based on various components which can be used in general detergent builders and a mixed ratio thereof, unless the functional effects of the present invention are sacrificed.

The above-mentioned cleaning agent may be a powder cleaning agent or a liquid cleaning agent. In addition to the water-soluble polymer, an additive generally used in cleaning agents may be added in the above-mentioned cleaning agent. Examples of the above-mentioned additive include surfactants, alkali builders, chelate builders, anti-redeposition agents for preventing redeposition of contamination, such as: polyacrylate; polycarboxylate such as polyacrylate/malate copolymer; and carboxymethyl cellulose sodium, soil inhibitors such as benzotriazol and ethylene thiourea, soil release agents, color transfer inhibitors, softening agents, alkaline substances for pH control, perfumes, solubilizing agents, fluorescence agents, coloring agents, foaming agents, foam stabilizers, lustering agents, fungicides, bleaching agents, bleaching assistants, enzymes, dyes, and solvents. It is preferable that zeolite is mixed if the cleaning agent is a powder cleaning agent.

If the water-soluble polymer is used in the above-mentioned cleaning agent, 0.1 to 20% by weight of the water-soluble polymer is preferably added, relative to 100% by weight of the cleaning agent. The water-soluble polymer is more preferably 0.2 to 10% by weight, and still more preferably 0.3 to 5% by weight, and particularly preferably 0.4 to 4% by weight. If the water-soluble polymer is less than 0.1% by weight, the cleaning agent may be insufficient in detergency. More than 20% by weight of the water-soluble polymer may lead to economical inefficient.

The mixed form of the water-soluble polymer in the above-mentioned cleaning agent may be in liquid or solid form, and can be determined depending on the form of the cleaning agent at the time of delivery (for example, a liquid substance or a solid substance). The water-soluble polymer may be mixed in form of aqueous solution after polymerization, or in a concentrated state in which moisture in the aqueous solution is decreased to some extent, or in a state after dried and solidified.

The above-mentioned cleaning agent includes cleaning agents used only in a specific application such as bleaching agents and textile auxiliaries in which one function of the component is enhanced, in addition to synthetic detergents of household use, detergents for industrial use such as fiber industry use, and hard surface washing agents.

The above-mentioned surfactant is at least one species selected from anionic surfactants, nonionic surfactants, cationic surfactants, and amphoteric surfactants. One or two or more species of these surfactants may be used. If two or more species of them are used, the use amount of the anionic surfactant and the nonionic surfactant is preferably 50% by weight or more, and more preferably 60% by weight or more, and still more preferably 70% by weight or more, and particularly preferably 80% by weight or more, relative to 100% by weight of the whole of the surfactant.

Examples of the above-mentioned anionic surfactants include alkylbenzene sulfonates, alkyl ether sulfates, alkenyl ether sulfates, alkyl sulfates, alkenyl sulfates, α-olefin sulfonates, α-sulfofatty acids or ester salts thereof, alkane sulfonates, saturated fatty acid salts, unsaturated fatty acid salts, alkyl ether carboxylates, alkenyl ether carboxylates, amino acid surfactants, N-acylamino acid surfactants, alkyl phosphate or salts thereof, and alkenyl phosphate or salts thereof.

The alkyl group or the alkenyl group of the above-mentioned anionic surfactants may have a branched structure of the alkyl group such as a methyl group.

Preferred examples of the above-mentioned nonionic surfactants include polyoxyalkylene alkyl ethers, polyoxyalkylene alkenyl ethers, polyoxyethylene alkyl phenyl ethers, higher fatty acid alkanol amides or alkylene oxide adducts thereof, sucrose fatty acid esters, alkyl glycoxides, fatty acid glycerin monoesters, and alkylamine oxides. The alkyl group or the alkenyl group of the above-mentioned nonionic surfactants may have a branched structure of the alkyl group such as a methyl group.

Quarternary ammonium salts and the like may be preferable as the above-mentioned cationic surfactants.

Carboxyl type or sulfobetaine type amphoteric surfactants may be mentioned as the above-mentioned amphoteric surfactants.

The alkyl group or the alkenyl group of the above-mentioned cationic surfactants or the above-mentioned amphoteric surfactants may have a branched structure of the alkyl group such as a methyl group.

The mixed ratio of the above-mentioned surfactant is generally preferably 10 to 60% by weight, relative to 100% by weight of the liquid cleaning agent. The mixed ratio thereof is more preferably 15% by weight or more and 50% by weight or less, and still more preferably 20% by weight or more and 45% by weight or less, and particularly preferably 25% by weight or more and 40% by weight or less. If the mixed ratio of the surfactant is less than 10% by weight, the detergent may exhibit insufficient detergency. If it is more than 60% by weight, economic efficiency may be reduced.

The mixed ratio of the above-mentioned builder for liquid cleaning agents is generally preferably 0.1 to 20% by weight, relative to 100% by weight of the liquid cleaning agent. The mixed ratio thereof is more preferably 0.2% by weight or more and 15% by weight or less, and more preferably 0.3% by weight or more and 10% by weight or less, and still more preferably 0.4% by weight or more and 8% by weight or less, and particularly preferably 0.5% by weight or more and 5% by weight or less. If the mixed ratio of the builder for liquid cleaning agents is less than 0.1% by weight, the cleaning agent may exhibit insufficient detergency. If it is more than 20% by weight, economic efficiency may be reduced.

The moisture content of the above-mentioned liquid cleaning agent is generally preferably 0.1 to 75% by weight, relative to 100% by weight of the liquid cleaning agent. The moisture content thereof is more preferably 0.2% by weight or more and 70% by weight or less, and still more preferably 0.5% by weight or more and 65% by weight or less, and particularly preferably 0.7% by weight or more and 60% by weight or less, and more particularly preferably 1% by weight or more and 55% by weight or less, and most preferably 1.5% by weight or more and 50% by weight or less.

The above-mentioned liquid cleaning agent preferably has a kaolin turbidity of 200 mg/L or less. The kaolin turbidity is more preferably 150 mg/L or less, and still more preferably 120 mg/L or less, and particularly preferably 100 mg/L or less, and most preferably 50 mg/L or less.

A difference in kaolin turbidity between a case where the water-soluble polymer of the present invention is added to the liquid cleaning agent and a case where it is not added to the liquid cleaning agent is preferably 500 mg/L or less. The difference is more preferably 400 mg/L or less, and still more preferably 300 mg/L or less, and particularly preferably 200 mg/L or less, and most preferably 100 mg/L or less. The above-mentioned kaolin turbidity can be determined by the following method, for example.

<Measurement Method of Kaoline Turbidity>

Into a 50 mm square cell in 10 mm thickness is charged a uniformly stirred sample (liquid cleaning agent), and bubbles are removed therefrom. Then, the solution is measured for turbidity (kaolin turbidity: mg/L) at 25° C. using NDH2000 (trade name, turbidimeter) produced by Nippon Denshoku Industries Co., Ltd.

Examples of the enzymes which can be mixed with the cleaning agent of the present invention include amylase, protease, lipase, and cellulase. Among them, preferred are alkali amylase, protease, alkali lipase, and alkali cellulase each showing high activity in alkaline cleaning solutions.

The addition amount of the above-mentioned enzyme is preferably 5% by weight or less relative to 100% by weight of the cleaning agent. If the addition amount thereof is more than 5% by weight, the detergency is not improved anymore, and economic efficiency may be reduced.

Preferred examples of the above-mentioned alkali builders include silicates, carbonates, sulfates and the like. Preferred examples of the above-mentioned chelate builders include diglycolic acid, oxycarboxylate, EDTA (ethylenediaminetetraacetic acid), DTPA (diethylenetriaminepentaacetic acid), and citric acid. Water-soluble polycarboxylic acid polymers may be used as the chelate builder.

The above-mentioned cleaning agent can be a cleaning agent: excellent in dispersibility; having agent performances with extremely high quality; and excellent in stability in which reduction in the performances after storage for a long period or impurity precipitation during storage at a low temperature is hardly caused.

The above-mentioned water treatment agent is added to water-systems such as cooling water system and boiler water system. In this case, the water-soluble polymer may be added as it is, or the water treatment agent containing a component other than the water-soluble polymer may be added.

A composition component other than the water-soluble polymer or a mixed ratio thereof in the above-mentioned water treatment agent may be appropriately adopted based on various components which can be used in general water treatment agents and a mixed ratio thereof, unless the functional effects of the present invention are sacrificed.

The above-mentioned dispersant is an aqueous dispersant. Preferred examples thereof include pigment dispersants, cement dispersants, calcium carbonate dispersants, and kaolin dispersants.

The above-mentioned dispersant can exhibit extremely excellent dispersibility which the water-soluble polymer originally has. Further, the above-mentioned dispersant can be a dispersant having agent performances with extremely high quality and excellent in stability in which reduction in the performances after storage for a long period or impurity precipitation during storage at a low temperature is hardly caused.

A composition component other than the water-soluble polymer or a mixed ratio thereof in the above-mentioned dispersant may be appropriately adopted based on various components which can be used in general dispersants and a mixed ratio thereof, unless the functional effects of the present invention are sacrificed.

The water-soluble polymer of the present invention is preferably used in applications such as the detergent builders, the cleaning agents, the water treatment agents, and the dispersants, as mentioned above. Various properties exhibited by the water-soluble copolymer are improved in applications in which the polymer is used. Therefore, the water-soluble polymer is preferably used in other applications.

The continuous production method of the water-soluble polymer according to the present invention has the above-mentioned configuration, and is a continuous production method for producing a water-soluble polymer with a narrow molecular weight distribution with high efficiency, the water-soluble polymer being preferably used in aqueous dispersants (including a pigment dispersant), scale inhibitors, detergent builders and cleaning agents using such detergent builders, metal ion sealants, thickeners, various binders, and the like.

BEST MODE FOR CARRYING OUT THE INVENTION

The present invention will, hereinafter, be described in more detail with reference to Examples, but the present invention is not limited to only these Examples. The terms, "part" and "%" represent "part by weight" and "% by weight", respectively, unless otherwise specified.

EXAMPLE 1

Prepared was a loop line type reactor equipped with: a 2 L-glass separable flask with a pump for discharging a reaction liquid; a cooling device; a static mixer; a circulation line, a raw material supply line, a line for discharge from the system, each line having an adjustable opening. Water 720 g was previously charged into the separable flask and heated to 90° C. The pump for discharging a reaction liquid was started under the condition. Then, specific amounts of the following raw materials were each supplied from the raw material supply line while adjusting a cooling water temperature and a cooling water amount such that the temperature inside the flask is maintained at 90° C. Raw materials were a 80% by weight aqueous solution of acrylic acid (80% AAaq.), a 48% by weight aqueous solution of sodium hydroxide (48% NaOHaq.), a 35% by weight aqueous solution of sodium hydrogen sulfite (35% SBSaq.), a 15% by weight aqueous solution of sodium persulfate (sodium peroxodisulfate) (15% NaPSaq.), and a 5 ppm by weight aqueous solution of Mohr's salt (iron (II) sulfate ammonium hexahydrate). Table 1 shows the polymerization conditions. The molecular weight was adjusted through increase or decrease of the sodium hydrogensulfite.

A total weight of the added monomer, initiator, chain transfer agent, and catalyst aqueous solution (Mohr's salt aqueous solution) was 1440 g/hr, and the retention time was 30 minutes. An opening was adjusted such that a circulation ratio (=circulating amount/amount of liquid discharged from the system) was 10. The reaction was performed for 6 hours under this state. Then, the supply of the raw materials and the circulation were stopped, and the reaction liquid remaining inside the flask was cooled and then removed. Into the reaction liquid was added 48% by weight sodium hydroxide and thereby the reaction liquid was neutralized until showing a pH of 7.

TABLE 1

| | | | Example 1 | | | | | | |
|---|---|---|---|---|---|---|---|---|---|
| | | | Polymer 1-1 | Polymer 1-2 | Polymer 1-3 | Polymer 1-4 | Polymer 1-5 | Polymer 1-6 | Polymer 1-7 |
| Initial charge | Pure water | (g) | 720 | 720 | 720 | 720 | 720 | 720 | 720 |
| Addition amount | 80% AAaq. | (g/hr) | 834.2 | 834.2 | 834.2 | 834.2 | 834.2 | 834.2 | 834.2 |
| | | (mol/hr) | 9.27 | 9.27 | 9.27 | 9.27 | 9.27 | 9.27 | 9.27 |
| | 48% NaOHaq. | (g/hr) | 38.6 | 38.6 | 38.6 | 38.6 | 38.6 | 38.6 | 38.6 |
| | | (mol/hr) | 0.46 | 0.46 | 0.46 | 0.46 | 0.46 | 0.46 | 0.46 |

TABLE 1-continued

| | | | | | | | | |
|---|---|---|---|---|---|---|---|---|
| 35% SBSaq. | (g/hr) | 39.7 | 53.0 | 79.4 | 92.7 | 96.7 | 105.9 | 119.2 |
| | (g/mol · hr) | 1.5 | 2.0 | 3.0 | 3.5 | 3.65 | 4.0 | 4.5 |
| 15% NaPSaq. | (g/hr) | 123.6 | 123.6 | 123.6 | 123.6 | 123.6 | 123.6 | 123.6 |
| | (g/mol · hr) | 2.0 | 2.0 | 2.0 | 2.0 | 2.0 | 2.0 | 2.0 |
| Mohr's salt | (g/hr) | 0.0072 | 0.0072 | 0.0072 | 0.0072 | 0.0072 | 0.0072 | 0.0072 |
| | (ppm) | 5.0 | 5.0 | 5.0 | 5.0 | 5.0 | 5.0 | 5.0 |
| Pure water | (g/hr) | 403.9 | 390.6 | 364.2 | 350.9 | 346.9 | 337.7 | 324.4 |
| Polymerization concentration | (%) | 46.3 | 46.3 | 46.3 | 46.3 | 46.3 | 46.3 | 46.3 |
| Polymerization temperature | (° C.) | 90 | 90 | 90 | 90 | 90 | 90 | 90 |
| Polymerization time | (hr) | 6 | 6 | 6 | 6 | 6 | 6 | 6 |
| Retention time | (hr) | 0.5 | 0.5 | 0.5 | 0.5 | 0.5 | 0.5 | 0.5 |
| Circulation ratio | | 10 | 10 | 10 | 10 | 10 | 10 | 10 |
| Production amount | (g/hr) | 1440 | 1440 | 1440 | 1440 | 1440 | 1440 | 1440 |
| Use of cooling device | | Used | Used | Used | Used | Used | Used | Used |
| Final neutralization degree | (%) | 97 | 97 | 97 | 97 | 97 | 97 | 97 |
| Circulation line: Difference in temperature between inlet and outlet | | 4.2 | 3.7 | 2.8 | 2.6 | 1.8 | 2.3 | 1.7 |

| | | | Example 1 | | | Comparative Example 1 | Comparative Example 2 |
|---|---|---|---|---|---|---|---|
| | | | Polymer 1-8 | Polymer 1-9 | Polymer 1-10 | Comparative Polymer 1 | Comparative Polymer 2 |
| Initial charge | Pure water | (g) | 720 | 720 | 720 | 720 | 720 |
| Addition amount | 80% AAaq. | (g/hr) | 834.2 | 834.2 | 834.2 | 834.2 | 139.0 |
| | | (mol/hr) | 9.27 | 9.27 | 9.27 | 9.27 | 1.54 |
| | 48% NaOHaq. | (g/hr) | 38.6 | 38.6 | 38.6 | 38.6 | 6.44 |
| | | (mol/hr) | 0.46 | 0.46 | 0.46 | 0.46 | 0.077 |
| | 35% SBSaq. | (g/hr) | 132.4 | 264.8 | 291.3 | 119.2 | 19.9 |
| | | (g/mol · hr) | 5.0 | 10.0 | 11.0 | 4.5 | 4.5 |
| | 15% NaPSaq. | (g/hr) | 123.6 | 123.6 | 123.6 | 123.6 | 20.6 |
| | | (g/mol · hr) | 2.0 | 2.0 | 2.0 | 2.0 | 2.0 |
| | Mohr's salt | (g/hr) | 0.0072 | 0.0072 | 0.0072 | 0.0072 | 0.0012 |
| | | (ppm) | 5.0 | 5.0 | 5.0 | 5.0 | 5.0 |
| | Pure water | (g/hr) | 311.2 | 178.8 | 152.3 | 324.4 | 54.1 |
| Polymerization concentration | | (%) | 46.3 | 46.3 | 46.3 | 46.3 | 46.3 |
| Polymerization temperature | | (° C.) | 90 | 90 | 90 | 90 | 90 |
| Polymerization time | | (hr) | 6 | 6 | 6 | 6 | 9 |
| Retention time | | (hr) | 0.5 | 0.5 | 0.5 | 0.5 | 3 |
| Circulation ratio | | | 10 | 10 | 10 | 10 | 1 |
| Production amount | | (g/hr) | 1440 | 1440 | 1440 | 1440 | 1440 |
| Use of cooling device | | | Used | Used | Used | Not used | Used |
| Final neutralization degree | | (%) | 97 | 97 | 97 | 97 | 97 |
| Circulation line: Difference in temperature between inlet and outlet | | | 1.9 | 1.6 | 1.8 | 27.2 (✗·Boiling point) | 28.6 (✗·Boiling point) |

COMPARATIVE EXAMPLE 1

The Same Retention Time as in Example 1 and No Cooling Device

A reaction was performed under the same manner as in Example 1, except that no cooling water was circulated, that is, the reaction temperature was not adjusted by not operating the cooling device. The polymerization condition was equal to that in the above-mentioned polymer 1-7.

COMPARATIVE EXAMPLE 2

Long Retention Time, Large Difference in Temperature Between the Circulation Outlet and the Circulation Inlet, with Cooling Device Prepared was a loop line type reactor equipped with: a 2 L-glass separable flask with a pump for discharging a reaction liquid; a cooling device; a static mixer; a circulation line, a raw material supply line, a line for discharge from a system to the outside, each line having an adjustable opening. Water 720 g was previously charged into the separable flask and heated to 90° C. The pump for discharging a reaction liquid was started under the condition. Then, specific amounts of the following raw materials were each supplied from the raw material supply line. Raw materials were a 80% by weight aqueous solution of acrylic acid, a 48% by weight aqueous solution of sodium hydroxide, a 35% by weight aqueous solution of sodium hydrogen sulfite, a 15% by weight aqueous solution of sodium persulfate (sodium peroxodisulfate), and a 5 ppm by weight aqueous solution of Mohr's salt. Table 1 shows the polymerization condition.

A total weight of the added monomer, initiator, chain transfer agent and catalyst aqueous solution was 240 g/hr, and the retention time was 180 minutes. The circulation ratio (=circulation amount/amount of liquid discharged from the system) was adjusted to 1. The reaction was performed for 9 hours under this state. Then, the supply of the raw materials and the circulation were stopped, and the reaction liquid remaining inside the flask was cooled and then removed. Into the reaction liquid was added 48% by weight sodium hydroxide and thereby the reaction liquid was neutralized until showing a pH of 7.

COMPARATIVE EXAMPLE 3

Batch Polymerization

Water 350 g was added into a 2 L-glass separable flask and heated to 90° C. Under the condition, specific amounts of the following raw materials were added into the flask while performing stirring by a Teflon (registered trademark) stirring blade and performing cooling by wind such that the temperature inside the flask was maintained at 90° C. Raw materials were a 80% by weight aqueous solution of acrylic acid, a 48% by weight aqueous solution of sodium hydroxide, a 35% by weight aqueous solution of sodium hydrogen sulfite, a 15% by weight aqueous solution of sodium persulfate (sodium peroxodisulfate), and a 5 ppm by weight aqueous solution of Mohr's salt. The rate of the addition is shown in the polymerization condition (Table 2) and the molecular weight was adjusted through increase or decrease of the sodium hydrogensulfite.

The temperature was maintained for 30 minutes after the raw materials had been supplied. Then, the reaction liquid was cooled and neutralized by adding 48% by weight sodium hydroxide thereinto until showing a pH of 7.

TABLE 2

|  |  |  | Comparative Example 3 | | | | |
|---|---|---|---|---|---|---|---|
|  |  |  | Comparative Polymer 3-1 | Comparative Polymer 3-2 | Comparative Polymer 3-3 | Comparative Polymer 3-4 | Comparative Polymer 3-5 |
| Initial charge | Mohr's salt | (g) | 0.00147 | 0.00148 | 0.00150 | 0.00151 | 0.00153 |
|  | Pure water | (g) | 350 | 350 | 350 | 350 | 350 |
| Addition | 80% AAaq. | (g) | 900 | 900 | 900 | 900 | 900 |
|  |  | (mol) | 10 | 10 | 10 | 10 | 10 |
|  | 48% NaOHaq. | (g) | 41.7 | 41.7 | 41.7 | 41.7 | 41.7 |
|  |  | (mol) | 0.5 | 0.5 | 0.5 | 0.5 | 0.5 |
|  | 35% SBSaq. | (g) | 42.9 | 57.1 | 71.4 | 85.7 | 100.0 |
|  |  | (g/mol) | 1.5 | 2.0 | 2.5 | 3.0 | 3.5 |
|  | 15% NaPSaq. | (g) | 133.3 | 133.3 | 133.3 | 133.3 | 133.3 |
|  |  | (g/mol) | 2.0 | 2.0 | 2.0 | 2.0 | 2.0 |
| Addition time (min) | 80% AAaq. |  | 0-180 | 0-180 | 0-180 | 0-180 | 0-180 |
|  | 48% NaOHaq. |  | 0-180 | 0-180 | 0-180 | 0-180 | 0-180 |
|  | 35% SBSaq. |  | 0-175 | 0-175 | 0-175 | 0-175 | 0-175 |
|  | 15% NaPSaq. |  | 0-185 | 0-185 | 0-185 | 0-185 | 0-185 |
| Polymerization and maturing temperature | | (° C.) | 90 | 90 | 90 | 90 | 90 |
| Maturing time |  | (min) | 30 | 30 | 30 | 30 | 30 |
| Production amount |  | (g/hr) | 410 | 414 | 418 | 422 | 426 |
| Posttreatment | 48% NaOHaq. | (g) | 766.7 | 766.7 | 766.7 | 766.7 | 766.7 |
|  |  | (g/mol) | 9.2 | 9.2 | 9.2 | 9.2 | 9.2 |
| Final neutralization degree |  | (%) | 97 | 97 | 97 | 97 | 97 |

|  |  |  | Comparative Example 3 | | | |
|---|---|---|---|---|---|---|
|  |  |  | Comparative Polymer 3-6 | Comparative Polymer 3-7 | Comparative Polymer 3-8 | Comparative Polymer 3-9 |
| Initial charge | Mohr's salt | (g) | 0.00154 | 0.00155 | 0.00157 | 0.00171 |
|  | Pure water | (g) | 350 | 350 | 350 | 350 |
| Addition | 80% AAaq. | (g) | 900 | 900 | 900 | 900 |
|  |  | (mol) | 10 | 10 | 10 | 10 |
|  | 48% NaOHaq. | (g) | 41.7 | 41.7 | 41.7 | 41.7 |
|  |  | (mol) | 0.5 | 0.5 | 0.5 | 0.5 |
|  | 35% SBSaq. | (g) | 114.3 | 128.6 | 142.9 | 285.7 |
|  |  | (g/mol) | 4.0 | 4.5 | 5.0 | 10.0 |
|  | 15% NaPSaq. | (g) | 133.3 | 133.3 | 133.3 | 133.3 |
|  |  | (g/mol) | 2.0 | 2.0 | 2.0 | 2.0 |
| Addition time (min) | 80% AAaq. |  | 0-180 | 0-180 | 0-180 | 0-180 |
|  | 48% NaOHaq. |  | 0-180 | 0-180 | 0-180 | 0-180 |
|  | 35% SBSaq. |  | 0-175 | 0-175 | 0-175 | 0-175 |
|  | 15% NaPSaq. |  | 0-185 | 0-185 | 0-185 | 0-185 |
| Polymerization and maturing temperature | | (° C.) | 90 | 90 | 90 | 90 |
| Maturing time |  | (min) | 30 | 30 | 30 | 30 |
| Production amount |  | (g/hr) | 430 | 434 | 438 | 477 |
| Posttreatment | 48% NaOHaq. | (g) | 766.7 | 766.7 | 766.7 | 766.7 |
|  |  | (g/mol) | 9.2 | 9.2 | 9.2 | 9.2 |
| Final neutralization degree |  | (%) | 97 | 97 | 97 | 97 |

Table 3 shows: the addition amounts of the sodium persulfate and the sodium hydrogensulfite in Example 1 and Comparative Examples 1 to 3; and the weight average molecular weight, the number average molecular weight, and the molecular weight distribution (Mw/Mn) in the obtained polymers 1-1 to 1-10, and comparative polymers 1 to 3-9. As the sample were used the polymers obtained in the above-mentioned polymerization as they were. The weight average molecular weight and the number average molecular weight were measured under the above-mentioned measurement conditions and with the above-mentioned apparatus.

in the reaction liquid could be decreased. Therefore, the superiority in the Mw/Mn could be recognized and the polymers with a Mw/Mn narrower than that of the polymers produced by the conventional batch polymerization could be produced.

TABLE 3

|  |  | Sodium persulfate [g/mol] | Sodium hydrogen sulfite [g/mol] | Weight average molecular weight [Mw] | Number average molecular weight [Mn] | Mw/Mn |
|---|---|---|---|---|---|---|
| Example 1 | Polymer 1-1 | 2.0 | 1.5 | 19433 | 6802 | 2.827 |
|  | Polymer 1-2 | 2.0 | 2.0 | 15477 | 5655 | 2.729 |
|  | Polymer 1-3 | 2.0 | 3.0 | 10897 | 4163 | 2.618 |
|  | Polymer 1-4 | 2.0 | 3.5 | 8963 | 3654 | 2.453 |
|  | Polymer 1-5 | 2.0 | 3.65 | 8652 | 3572 | 2.422 |
|  | Polymer 1-6 | 2.0 | 4.0 | 7560 | 3131 | 2.414 |
|  | Polymer 1-7 | 2.0 | 4.5 | 6367 | 2762 | 2.305 |
|  | Polymer 1-8 | 2.0 | 5.0 | 5586 | 2443 | 2.288 |
|  | Polymer 1-9 | 2.0 | 10.0 | 3190 | 1640 | 1.945 |
|  | Polymer 1-10 | 2.0 | 11.0 | 2140 | 1250 | 1.710 |
| Comparative Example 1 | Comparative polymer 1 | 2.0 | 4.5 | 6890 | 2550 | 2.702 |
| Comparative Example 2 | Comparative polymer 2 | 2.0 | 4.5 | 7555 | 2377 | 3.179 |
| Comparative Example 3 | Comparative polymer 3-1 | 2.0 | 1.5 | 14543 | 4403 | 3.287 |
|  | Comparative polymer 3-2 | 2.0 | 2.0 | 12089 | 3868 | 3.122 |
|  | Comparative polymer 3-3 | 2.0 | 2.5 | 10420 | 3524 | 2.957 |
|  | Comparative polymer 3-4 | 2.0 | 3.0 | 8354 | 2956 | 2.826 |
|  | Comparative polymer 3-5 | 2.0 | 3.5 | 7746 | 2839 | 2.728 |
|  | Comparative polymer 3-6 | 2.0 | 4.0 | 7202 | 2647 | 2.721 |
|  | Comparative polymer 3-7 | 2.0 | 4.5 | 5963 | 2385 | 2.501 |
|  | Comparative polymer 3-8 | 2.0 | 5.0 | 4641 | 2043 | 2.271 |
|  | Comparative polymer 3-9 | 2.0 | 10.0 | 1950 | 1190 | 1.634 |

Figure 3:
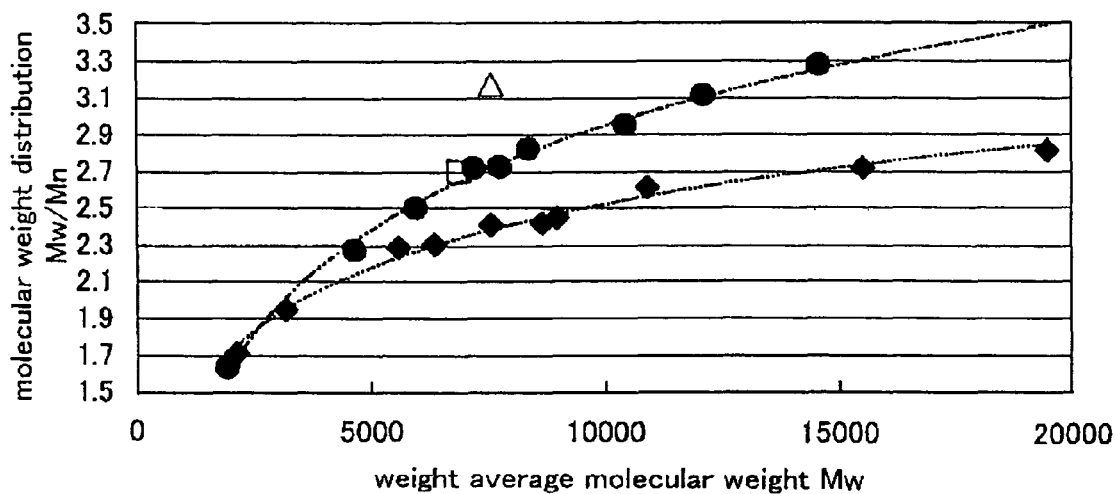
[FIG. 3]
Figure 4:
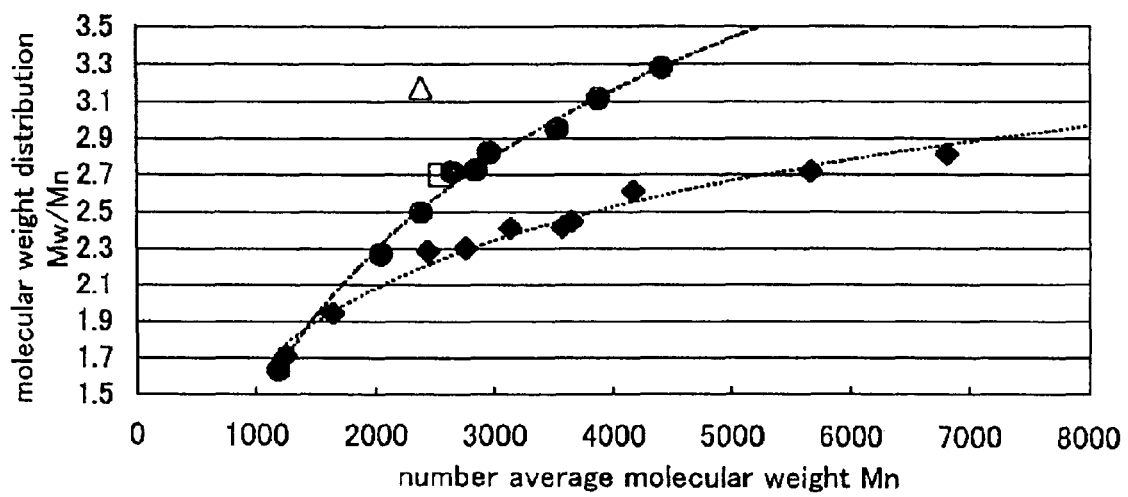
[FIG. 4]
Figure 5:
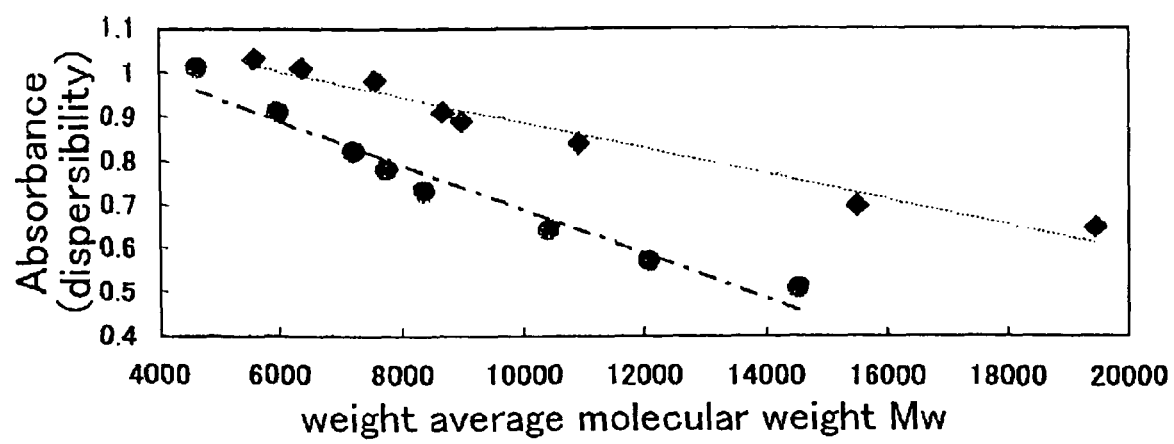
[FIG. 5]

FIGS. 3 and 4 shows molecular weight dependence of Mw/Mn of the polymers 1-1 to 1-10 obtained in Example 1 and the comparative polymers 1 to 3-9 obtained in Comparative Examples 1 to 3. FIG. 5 shows a relationship between absorbance and weight average molecular weight in the polymers 1-1 to 1-8 and the comparative polymers 3-1 to 3-8. In FIGS. 3, 4 and 5 ♦ represents the polymers 1-1 to 1-10, □ represents the comparative polymer 1, Δ represents the comparative polymer 2, and ● represents the comparative polymers 3-1 to 3-9. In FIG. 3 (and FIG. 4), the Mw/Mn becomes wider along the longitudinal axis toward the positive direction, in the same weight average molecular weight Mw (number average molecular weight Mn). If the weight average molecular weight Mw is defined as X and the Mw/Mn is defined as Y and a logarithm approximation of Y=a·ln(x)+b (ln(x) being base X natural logarithm) is given, it is shown that increment of the Mw/Mn is smaller as the coefficient a is small even if the weight molecular weight increases.

FIG. 3 shows that when the cooling and the circulation ratio were insufficient, the Mw/Mn was dramatically increased because the difference in temperature between the circulation line inlet and the circulation line outlet was larger, that is, the temperature gradient in the circulation liquid was large, even if the retention time was prolonged for suppression of the reaction heat. In contrast, under the polymerization conditions specified by the present invention, the reaction heat could be sufficiently removed, and the concentration gradient The polymers belonging to the region showing a relatively small Mn (1500 to 3500 of Mn) in FIG. 3 can be mixed with a liquid cleaning agent or provided as an inorganic dispersant, such as kaolin dispersant. The polymers belonging to the region showing a large Mn (Mn of 3500 or more and 30000 or less) can be mixed with a powder cleaning agent and provided as a fiber treatment agent and the like. With respect to the polymers belonging to the region showing a relatively small Mn, the viscosity of the reaction liquid in the reaction system was not high and the stirring was sufficiently performed. Therefore, the difference in the Mw/Mn depending on the production method was not recognized so much. However, it would appear that the larger the Mw (Mn) becomes, with an increase of the viscosity in the system, the larger the influence of the insufficient cooling (increase in temperature gradient) and the concentration gradient, caused by the insufficient stirring, becomes. That is, due to decrease of chain transfer agent, vaporization of components in the reaction system out of the system, etc., the condition of the polymerization varies. Then, Mw increases undesirably, which cases Mw/Mn increase. In the present invention, the fast reaction, the sufficient stirring, and the sufficient cooling were accomplished. Therefore, even in the region showing a small Mw (Mn), water-soluble polymers with a Mw/Mn equal to that of the polymers produced by the conventional batch polymerization with productivity higher than that of the batch polymerization. And in the region showing a large Mw (Mn), water-soluble polymers with a Mw/Mn narrower than that of the polymers produced by the conventional batch polymerization while maintaining the high productivity.

<Performance Evaluation 1> (Clay Dispersibility)

The polymers 1-1 to 1-8 and the comparative polymers 3-1 to 3-8 were measured for clay dispersibility by the following method.

Pure water was added to glycine 67.56 g, sodium chloride 52.6 g, and NaOH 2.4 g to prepare a mixture 600 g (this mixture was referred to as a buffer A). Into the buffer A 60 g were added calcium chloride dihydrate 0.3268 g and further pure water to prepare a mixture 1000 g (this mixture was referred to as a buffer B). The buffer B 36 g was added to a 0.1% by weight aqueous solution of the polymer to be measured (the polymers 1-1 to 1-8 and the comparative polymers 3-1 to 3-8) (on part by weight of solids equivalent basis) 4 g and the mixture was stirred to prepare a dispersion solution. Into a test tube (product of IWAKI GLASS Co., Ltd: 18 mm in diameter, and 180 mm in height) was charged clay (product of The Association of Powder Process Industry and Engineering, JAPAN, test dusts Class 8) 0.3 g and then the above-mentioned dispersion solution 30 g was added and then the test tube was sealed. These conditions made the liquid have a calcium hardness of 200 ppm.

The test tube was shaken to disperse the clay uniformly. Then, the test tube was kept standing in the dark for 20 hours. After 20 hours, 5 cc of supernatant was taken from the dispersion liquid and measured for absorbance with UV spectroscope (produced by Shimadzu Corp. UV-1200; 1 cm cell, at a wavelength of 380 nm). The higher this value is, the higher the clay dispersibility is.

<Performance Evaluation 2> (Calcium Capturing Capability)

The polymers 1-1 to 1-8 and the comparative polymers 3-1 to 3-8 were measured for calcium capturing capability by the following method.

Sample solutions for calibration curve were prepared as follows. Using calcium chloride dihydrate as a calcium ion standard solution, 50 g of 0.01 mol/L, 0.001 mol/L, and 0.0001 mol/L aqueous solutions were each prepared. The solutions were adjusted to a pH of 9 to 11 with a 4.8% NaOH aqueous solution. Further, into the solutions was added 1 mL of 4 mol/L potassium chloride aqueous solution (hereinafter, abbreviated as 4M-KCl aqueous solution). Then, the solutions were sufficiently stirred with a magnetic stirrer. Similarly, sample solutions for test were prepared as follows. Using calcium chloride dihydrate as a calcium ion standard solution for test, a needed amount (50 g per sample) of 0.001 mol/L aqueous solutions were prepared.

Then, the test sample (the polymers 1-1 to 1-8 and the comparative polymers 3-1 to 3-8) 10 mg on solid matter equivalent basis was weighted and put into a 100 cc beaker. Thereinto was added the above-mentioned calcium ion standard solution for test 50 g, and the solution was stirred enough with a magnetic stirrer. Further, similar to the samples for calibration curve, the solution was adjusting to a pH 9.9 to 10.2 with a 4.8% NaOH aqueous solution and thereinto was added 1 mL of 4M-KCl aqueous solution.

The thus-prepared sample solutions for calibration curve and sample solutions for test were measured by calcium ion electrode 93-20 and reference electrode 90-01 produced by Orion Corp., using a titrator COMTITE-550 produced by Hiranuma Sangyo Co., Ltd.

The amount of the calcium ions captured by the sample (polymer) was calculated through the measurement values of the sample solutions for calibration curve and test. And the calculated value was represented by mg on calcium carbonate equivalent basis as a capturing amount per g solid content of the polymer. This value was defined as a value of calcium ion capturing capability.

TABLE 4

|  |  | Absorbance (Dispersibility) | Ca capturing capability |
|---|---|---|---|
| Example 1 | Polymer 1-1 | 0.65 | 302 |
|  | Polymer 1-2 | 0.70 | 287 |
|  | Polymer 1-3 | 0.84 | 267 |
|  | Polymer 1-4 | 0.89 | 258 |
|  | Polymer 1-5 | 0.91 | 256 |
|  | Polymer 1-6 | 0.98 | 253 |
|  | Polymer 1-7 | 1.01 | 250 |
|  | Polymer 1-8 | 1.03 | 237 |
| Comparative Example 3 | Comparative Example 3-1 | 0.51 | 283 |
|  | Comparative Example 3-2 | 0.57 | 272 |
|  | Comparative Example 3-3 | 0.64 | 265 |
|  | Comparative Example 3-4 | 0.73 | 255 |
|  | Comparative Example 3-5 | 0.78 | 253 |
|  | Comparative Example 3-6 | 0.82 | 252 |
|  | Comparative Example 3-7 | 0.91 | 243 |
|  | Comparative Example 3-8 | 1.01 | 238 |

Generally, in water with high hardness, polyacrylic acid (salts) is intermolecularly crosslinked by polyvalent ions such as calcium and magnesium, and then insoblized. Therefore, the dispersibility of the polyacrylic acid (salts) decreases as increase in the molecular weight under high hardness conditions. If such polyacrylic acid (salts) is used as a detergent builder or a dispersant under conditions of using water with high hardness, there is concern that the performances decrease due to the above-mentioned reason and desired performances can not be exhibited. In contrast, if polyacrylic acid (salt) has a low molecular weight, the polyacrylic acid (salt) disperses in the system event if polyvalent metal ions such as calcium and magnesium are captured. Therefore, if such polyacrylic acid (salts) is used as a detergent builder, for example, there is concern that such polyacrylic acid (salts) inhibits functions of detergent components. Because of the above, it is preferable that the molecular weight is large enough to capture the polyvalent metal ions and the dispersibility is independent from the molecular weight.

The sodium polyacrylate polymerized in Comparative Example 3 remarkably shows the above-mentioned tendency. That is, the dispersibility is high, but the calcium capturing capability is low in the low molecular weight range, and on the other hand, the calcium capturing capability is high and the dispersibility is low in the high molecular weight range.

In contrast, in the sodium polyacrylate polymerized in Example 1, the degree of reduction in dispersibility is small. FIG. 5 clearly shows that reduction in dispersibility in Example 1 is smaller than that in Comparative Example 3. From the above-mentioned results, the sodium polyacrylate prepared by the production method of the present invention can keep the clay dispersibility while sufficiently capturing the polyvalent metal ions such as calcium under high hardness conditions and thereby exhibits more preferable performances.

EXAMPLE 2

Polymers 2-1 to 2-5 were produced in polymerization conditions shown in Table 5, by the same method as in Example 1.

COMPARATIVE EXAMPLE 4

Batch Polymerization

A comparative polymer 4 was produced by the same method as in Comparative Example 3. Amounts shown in the polymerization conditions (Table 5) of the following aqueous solution was added in the following time. An alkali acid aqueous solution and a sodium hydroxide aqueous solution were each added in 180 minutes, a sodium hydrogensulfite aqueous solution was added in 175 minutes, a 15% by weight aqueous solution of sodium persulfate (peroxodisulfuric acid sodium) was added in 185 minutes.

The polymers 2-1 to 2-5 and the comparative polymers 4 to 8 were measured for weight average molecular weight (Mw), number average molecular weight (Mn) and molecular weight distribution (Mw/Mn) by GPC. The measurement conditions are as mentioned above.

Using the standard sodium polyacrylate shown in Table 6, a calibration curve showing a relationship between retention time and peak top molecular weight (Mp) was prepared. Based on this calibration curve, an integrated intensity (A) in a section between a retention time showing a molecular weight of 2500 and a retention time showing a molecular weight of 7000 and a total integrated intensity (B) of the polyacrylic acid and/or the salt thereof were obtained. Then, a ratio of (A) to (B) and [(A)/(B)]×100 were calculated. Table 7 shows the results.

TABLE 5

| | | | Example 2 | | | | | Comparative Example 4 |
|---|---|---|---|---|---|---|---|---|
| | | | Polymer 2-1 | Polymer 2-2 | Polymer 2-3 | Polymer 2-4 | Polymer 2-5 | Comparative Polymer 4 |
| Initial charge | Pure water | (g) | 720 | 720 | 720 | 720 | 720 | 350 |
| | Mohr's salt | (g) | 0 | 0 | 0 | 0 | 0 | 0.00155 |
| Addition amount | 80% AAaq. | (g/hr) | 834.2 | 834.2 | 834.2 | 834.2 | 834.2 | 900 |
| | | (mol/hr) | 9.27 | 9.27 | 9.27 | 9.27 | 9.27 | 10 |
| | 48% NaOHaq. | (g/hr) | 38.6 | 38.6 | 38.6 | 38.6 | 38.6 | 41.7 |
| | | (mol/hr) | 0.46 | 0.46 | 0.46 | 0.46 | 0.46 | 0.5 |
| | 35% SBSaq. | (g/hr) | 119.2 | 132.4 | 139.0 | 145.7 | 152.3 | 128.6 |
| | | (g/mol · hr) | 4.5 | 5.0 | 5.25 | 5.5 | 5.75 | 4.5 |
| | 15% NaPSaq. | (g/hr) | 123.6 | 123.6 | 123.6 | 123.6 | 123.6 | 133.3 |
| | | (g/mol · hr) | 2.0 | 2.0 | 2.0 | 2.0 | 2.0 | 2.0 |
| | Mohr's salt | (g/hr) | 0.0072 | 0.0072 | 0.0072 | 0.0072 | 0.0072 | 0 |
| | | (ppm) | 5.0 | 5.0 | 5.0 | 5.0 | 5.0 | 0 |
| | Pure water | (g/hr) | 324.4 | 311.2 | 304.6 | 298.0 | 291.3 | 0 |
| Polymerization concentration | | (%) | 46.3 | 46.3 | 46.3 | 46.3 | 46.3 | 46.3 |
| Polymerization temperature | | (° C.) | 90 | 90 | 90 | 90 | 90 | 90 |
| Polymerization time | | (min) | 360 | 360 | 360 | 360 | 360 | 215 |
| Retention time | | (hr) | 0.5 | 0.5 | 0.5 | 0.5 | 0.5 | — |
| Circulation ratio | | | 10 | 10 | 10 | 10 | 10 | (Batch polymerization) |
| Use of cooling device | | | Used | Used | Used | Used | Used | Used |

COMPARATIVE EXAMPLES 5 TO 8

As a comparative sample with a narrow molecular weight distribution, polyacrylic acid (Table 6) which is a standard sample for the following gel permeation chromatography (GPC) was used. In Table 6, PAA3k, PAA2k, PAA1k, and PAA18k were used as comparative polymers 5 to 8, respectively.

TABLE 6

| Sample | Mp |
|---|---|
| PAA1k | 900 |
| PAA2k | 1250 |
| PAA3k | 1770 |
| PAA4k | 2925 |
| PAA5k | 4100 |
| PAA8k | 7500 |
| PAA18k | 16000 |
| PAA35k | 28000 |
| PAA70k | 47500 |

TABLE 7

|  | Weight average molecular weight [Mw] | Number average molecular weight [Mn] | Mw/Mn | Mw 2500-7000 content ratio [area %] | Remarks |
|---|---|---|---|---|---|
| Polymer 2-1 | 6900 | 3000 | 2.35 | 39.8 | — |
| Polymer 2-2 | 6100 | 2700 | 2.29 | 41.1 | — |
| Polymer 2-3 | 5800 | 2500 | 2.31 | 41.2 | — |
| Polymer 2-4 | 5200 | 2300 | 2.27 | 41.5 | — |
| Polymer 2-5 | 4900 | 2200 | 2.23 | 41.8 | — |
| Comparative polymer 4 | 5300 | 2100 | 2.50 | 37.5 | Batch polymerization Mw 2500-8000 40.8 area % |
| Comparative polymer 5 | 2400 | 1650 | 1.45 | 26.1 | GPC sample; PAA3k Mw 1500-2500 50.6 area % |
| Comparative polymer 6 | 1930 | 1230 | 1.57 | 17.7 | GPC sample; PAA2k Mw 1500-2500 48.3 area % |
| Comparative polymer 7 | 1300 | 830 | 1.57 | 7.3 | GPC sample; PAA1k Mw 1500 or less 59.8 area % |
| Comparative polymer 8 | 18100 | 12800 | 1.41 | 23.4 | GPC sample; PAA18k Mw 6000-15000 44.5 area % |

Performance Evaluation (Clay Dispersibility)

Pure water was added to glycine 67.56 g, sodium chloride 52.6 g, and NaOH 2.4 g to prepare a mixture 600 g (this mixture was referred to as a buffer A). Into the buffer A 60 g were added calcium chloride dihydrate 0.3268 g and further pure water to prepare a mixture 1000 g (this mixture was referred to as a buffer B). The buffer B 27 g was added to a 0.02% by weight aqueous solution of the polymer to be measured (on part by weight of solids equivalent basis) 3 g and the mixture was stirred to prepare a dispersion solution. Into a test tube (product of IWAKI GLASS Co., Ltd: 18 mm in diameter, and 180 mm in height) was charged clay (product of The Association of Powder Process Industry and Engineering, JAPAN, test dusts Class 8) 0.3 g and then the above-mentioned dispersion solution 30 g was added and then the test tube was sealed. These conditions made the solution have a calcium hardness of 200 ppm.

The test tube was shaken to disperse the clay uniformly. Then, the test tube was kept standing in the dark for 5 hours at room temperatures (about 20° C.). After 5 hours, 5 cc of supernatant was taken from the dispersion solution and measured for absorbance with UV spectroscope (produced by Shimadzu Corp. UV-1200; 1 cm cell, at a wavelength of 380 nm). The higher the value is, the higher the clay dispersibility is. Table 8 shows the results.

TABLE 8

|  | Dispersibility (absorbance) |
|---|---|
| Polymer 2-1 | 0.92 |
| Polymer 2-2 | 0.94 |
| Polymer 2-3 | 0.91 |
| Polymer 2-4 | 0.90 |
| Polymer 2-5 | 0.92 |
| Comparative Polymer 4 | 0.83 |
| Comparative Polymer 5 | 0.82 |
| Comparative Polymer 6 | 0.64 |
| Comparative Polymer 7 | 0.33 |
| Comparative Polymer 8 | 0.59 |

EXAMPLE 3

A polymer 3 was produced in the polymerization condition shown in the following Table 9, by the same method as in Example 1. The polymer 3 was prepared by polymerizing under the same conditions as in the polymerization of the polymer 1-7 except that the addition of Mohr's salt was omitted.

TABLE 9

|  |  |  | Polymer 1-7 | Polymer 3 |
|---|---|---|---|---|
| Initial charge | Pure water | (g) | 720 | 720 |
| Addition amount | 80% AAaq. | (g/hr) | 834.2 | 834.2 |
|  |  | (mol/hr) | 9.27 | 9.27 |
|  | 48% NaOHaq. | (g/hr) | 38.6 | 38.6 |
|  |  | (mol/hr) | 0.46 | 0.46 |
|  | 35% SBSaq. | (g/hr) | 119.2 | 119.2 |
|  |  | (g/mol · hr) | 4.5 | 4.5 |
|  | 15% NaPSaq. | (g/hr) | 123.6 | 123.6 |
|  |  | (g/mol · hr) | 2.0 | 2.0 |
|  | Mohr's salt | (g/hr) | 0.0072 | 0 |
|  |  | (ppm) | 5.0 | 0 |
|  | Pure water | (g/hr) | 324.4 | 324.4 |
| Polymerization concentration |  | (%) | 46.3 | 46.3 |
| Polymerization temperature |  | (° C.) | 90 | 90 |
| Polymerization time |  | (min) | 360 | 360 |
| Retention time |  | (hr) | 0.5 | 0.5 |
| Circulation ratio |  |  | 10 | 10 |
| Use of cooling device |  |  | Used | Used |

The polymers 1-5 to 1-7 prepared in Example 1 and the polymer 3 were measured for weight average molecular weight (Mw), number average molecular weight (Mn) and molecular weight distribution (Mw/Mn) in the above-mentioned manner. The polymers were measured for residual amount of the monomer by liquid chromatography (LC) under the following conditions. Table 10 shows the results.

(LC Measurement Condition)

detection element: UV detecting element produced by Hitachi, Ltd. L-4000H (detection wavelength of 220 nm)

Column: G-3000PWXL (35° C.) produced by Tosho Corp.

Eluent: 0.1% by weight aqueous solution of phosphoric acid

Measurement time: 60 min/sample (elution rate 1.0 mL/min)

Sample concentration: 1% by weight solid matter

A desired monomer amount is previously calculated from the charged amount, and then a residual ratio (% by weight) is calculated from measurement result (residual amount of the monomer) in LC.

TABLE 10

|  | Weight average molecular weight [Mw] | Number average molecular weight [Mn] | Mw/Mn | Residual AA(%) |
|---|---|---|---|---|
| Polymer 1-5 | 8652 | 3572 | 2,422 | <0.1 |
| Polymer 1-6 | 7560 | 3131 | 2,414 | <0.1 |
| Polymer 1-7 | 6367 | 2762 | 2,305 | <0.1 |
| Polymer 3 | 7701 | 2921 | 2,637 | 10.3 |

The present application claims priority under 35 U.S.C. §119 to Japanese Patent Application No. 2005-251515 filed Aug. 31, 2005, entitled "CONTINUOUS PRODUCTION METHOD OF WATER-SOLUBLE POLYMER." And Japanese Patent Application No. 2006-012985 filed Jan. 20, 2006, entitled "CONTINUOUS PRODUCTION METHOD OF WATER-SOLUBLE POLYMER." The contents of these applications are incorporated herein by reference in their entirely.

The invention claimed is:

1. A continuous production method of a water-soluble polymer,
comprising:
circulating a circulation liquid containing a monomer having a polymerizable unsaturated bond through a reaction apparatus having a tank and a circulation line comprising a piping circulating outside the tank, and thereby producing a water-soluble polymer continuously; and
discharging part of the circulation liquid from a discharge line, wherein the circulation line is provided with a cooling device at least at one position; wherein a circulation ratio being calculated by dividing an amount of liquid returning to the tank by an amount of liquid discharged from the discharge line to the outside of the production apparatus is 3 or more and wherein a retention time of the circulation liquid in the tank and the circulation line (=a total amount of a reaction liquid /an amount of the reaction liquid discharged per unit time) is 240 minutes or less, and wherein in the reaction apparatus, the tank, the cooling device, and the raw material supply port are disposed in this order in the flow passage direction of the circulation liquid, and the discharge line is positioned between the tank and the cooling device or the tank, the raw material supply port and the cooling device are disposed in this order in the flow passage direction of the circulation liquid, and the discharge line is positioned between the tank and the raw material supply port.

2. The continuous production method of the water-soluble polymer according to claim 1,
wherein a monomer conversion efficiency at an inlet of the tank is 90% or more.

3. The continuous production method of the water-soluble polymer according to claim 1,
wherein the retention time of the circulation liquid in the tank and the circulation line is 120 minutes or less and a difference in temperature between an inlet of the circulation line and an outlet of the circulation line is within 25° C.

4. The continuous production method of the water-soluble polymer according to claim 1,
wherein the discharge line is positioned between the tank and the raw material supply port in a flow passage direction of the circulation liquid.

5. The continuous production method of the water-soluble polymer according to claim 1,
wherein a monomer concentration at an outlet of the tank is 0.3 mol/kg or less.

6. The continuous production method of the water-soluble polymer according to claim 1,
wherein a metal simple substance containing a metal with a plurality of oxidation numbers as a constitutional component, a salt thereof and/or a complex thereof are/is added from at least one position of the circulation line.

7. The continuous production method of the water-soluble polymer according to claim 1,
wherein an oxidizing agent is added between the discharge line and a next step.

8. The continuous production method of the water-soluble polymer according to claim 1,
wherein a raw material comprises an unsaturated carboxylic acid monomer.

9. The continuous production method of the water-soluble polymer according to claim 2,
wherein the retention time of the circulation liquid in the tank and the circulation line is 120 minutes or less and a difference in temperature between an inlet of the circulation line and an outlet of the circulation line is within 25° C.

10. The continuous production method of the water-soluble polymer according to claim 5,
wherein the retention time of the circulation liquid in the tank and the circulation line is 120 minutes or less and a difference in temperature between an inlet of the circulation line and an outlet of the circulation line is within 25° C.

11. The continuous production method of the water-soluble polymer according to claim 1, wherein the cooling device satisfies a relationship between a volume of the circulation liquid V [m$^3$] and a heat transmission area of the cooling device S [m$^2$] of S/V≧5.

12. The continuous production method of the water-soluble polymer according to claim 1, wherein the discharge line is provided with the cooling device at least at one position.

* * * * *